United States Patent
Sugawara et al.

(10) Patent No.: US 9,548,079 B2
(45) Date of Patent: Jan. 17, 2017

(54) MAGNETIC RECORDING AND REPRODUCING DEVICE AND MAGNETIC RECORDING AND REPRODUCING METHOD

(71) Applicant: KABUSHIKI KAISHA TOSHIBA, Tokyo (JP)

(72) Inventors: Katsuya Sugawara, Kawasaki (JP); Tomoyuki Maeda, Kawasaki (JP); Kenichiro Yamada, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/922,540

(22) Filed: Oct. 26, 2015

(65) Prior Publication Data

US 2016/0275985 A1  Sep. 22, 2016

(30) Foreign Application Priority Data

Mar. 18, 2015  (JP) .................. 2015-054539

(51) Int. Cl.
| | |
|---|---|
| *G11B 5/02* | (2006.01) |
| *G11B 5/09* | (2006.01) |
| *G11B 20/12* | (2006.01) |

(52) U.S. Cl.
CPC ... *G11B 20/1217* (2013.01); *G11B 2020/1238* (2013.01); *G11B 2020/1292* (2013.01)

(58) Field of Classification Search
CPC ............ G11B 20/1217; G11B 20/1252; G11B 2020/1238; G11B 20/00601; G11B 19/128; G11B 20/00405; G11B 27/3027; G11B 2220/90; G11B 5/012; G11B 5/02; G11B 5/00; G06F 11/1469; G06F 3/064; G06F 3/0619; G06F 3/0676; G06F 12/10
USPC .................. 360/39, 48, 55, 47, 260, 53
See application file for complete search history.

(56) References Cited

U.S. PATENT DOCUMENTS

| 7,982,994 B1 | 7/2011 | Erden et al. | |
|---|---|---|---|
| 9,336,096 B2 * | 5/2016 | Pantel | G11B 20/1252 |
| 2013/0057978 A1 | 3/2013 | Sakai et al. | |
| 2013/0083416 A1 | 4/2013 | Kasiraj et al. | |

(Continued)

FOREIGN PATENT DOCUMENTS

| JP | 2013-58271 | 3/2013 |
|---|---|---|
| JP | 2013-80552 | 5/2013 |
| JP | 2016-91586 | 5/2016 |

*Primary Examiner* — Nabil Hindi
(74) *Attorney, Agent, or Firm* — Finnegan, Henderson, Farabow, Garrett & Dunner LLP

(57) ABSTRACT

According to one embodiment, a magnetic recording and reproducing device includes a magnetic recording medium, a recording unit and a reproducing unit. The magnetic recording medium includes a first track and a second track, the first track extending in a first direction, the second track extending in the first direction and being arranged with the first track in a second direction intersecting the first direction. The first track includes first and second sub-tracks extending in the first direction. The second track includes third and fourth sub-tracks extending in the first direction. The second sub-track is disposed between the first and fourth sub-tracks. The third sub-track is disposed between the second and fourth sub-tracks. The recording unit records information in the first and second tracks. The reproducing unit reproduces first information recorded in the first track. The reproducing unit reproduces second information recorded in the second track.

19 Claims, 24 Drawing Sheets

(56) References Cited

U.S. PATENT DOCUMENTS

2016/0133293 A1    5/2016   Yamada et al.

* cited by examiner

MAGNETIC RECORDING AND REPRODUCING DEVICE AND MAGNETIC RECORDING AND REPRODUCING METHOD

CROSS-REFERENCE TO RELATED APPLICATIONS

This application is based upon and claims the benefit of priority from Japanese Patent Application No. 2015-054539, filed on Mar. 18, 2015; the entire contents of which are incorporated herein by reference.

FIELD

Embodiments described herein relate generally to a magnetic recording and reproducing device and a magnetic recording and reproducing method.

BACKGROUND

Information is recorded in a magnetic recording medium such as a HDD (Hard Disk Drive), etc., using a magnetic recording head. High density recording is desirable in a magnetic recording and reproducing device.

DETAILED DESCRIPTION

Figure 1A:
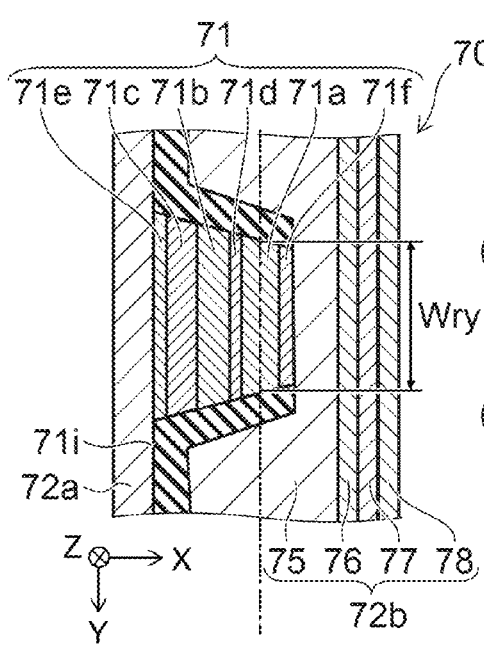
FIG. 1A to FIG. 1C are schematic plan views illustrating a magnetic recording and reproducing device according to a first embodiment.

According to one embodiment, a magnetic recording and reproducing device includes a magnetic recording medium, a recording unit and a reproducing unit. The magnetic recording medium includes a first track and a second track, the first track extending in a first direction, the second track extending in the first direction and being arranged with the first track in a second direction intersecting the first direction. The first track includes a first sub-track extending in the first direction, and a second sub-track extending in the first direction. The second track includes a third sub-track extending in the first direction, and a fourth sub-track extending in the first direction. The second sub-track is disposed between the first sub-track and the fourth sub-track. The third sub-track is disposed between the second sub-track and the fourth sub-track. The recording unit records information in the first track and the second track. The reproducing unit reproduces first information recorded in the first track while opposing the first sub-track, the second sub-track, and a first boundary between the first sub-track and the second sub-track. The reproducing unit reproduces second information recorded in the second track while opposing the third sub-track, the fourth sub-track, and a second boundary between the third sub-track and the fourth sub-track. The first sub-track has a first sub-track width along the second direction. The second sub-track has a second sub-track width along the second direction. The third sub-track has a third sub-track width along the second direction. The fourth sub-track has a fourth sub-track width along the second direction The third sub-track width is wider than the first sub-track width, is wider than the second sub-track width, and is wider than the fourth sub-track width.

According to one embodiment, a magnetic recording and reproducing method is disclosed. The method can include recording third sub-information in a third region of a magnetic recording medium after performing a first operation on the magnetic recording medium. The magnetic recording medium includes a first track and a second track, the first track extending in a first direction, the second track extending in the first direction and being arranged with the first track in a second direction intersecting the first direction. The first track includes a first sub-track extending in the first direction, and a second sub-track extending in the first direction. The second track includes a third sub-track extending in the first direction, and a fourth sub-track extending in the first direction. The second sub-track is disposed between the first sub-track and the fourth sub-track. The third sub-track is disposed between the second sub-track and the fourth sub-track. The first operation includes recording first sub-information corresponding to the first sub-track in a first region of the magnetic recording medium including the first sub-track, recording second sub-information corresponding to the second sub-track in a second region of the magnetic recording medium including the second sub-track, the second region and a portion of the first region overlapping, and recording fourth sub-information corresponding to the fourth sub-track in a fourth region of the magnetic recording medium including the fourth sub-track. The third sub-information corresponds to the third sub-track. The third region includes the third sub-track. The third region overlaps a portion of the second region and a portion of the fourth region.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

Figure 1B:
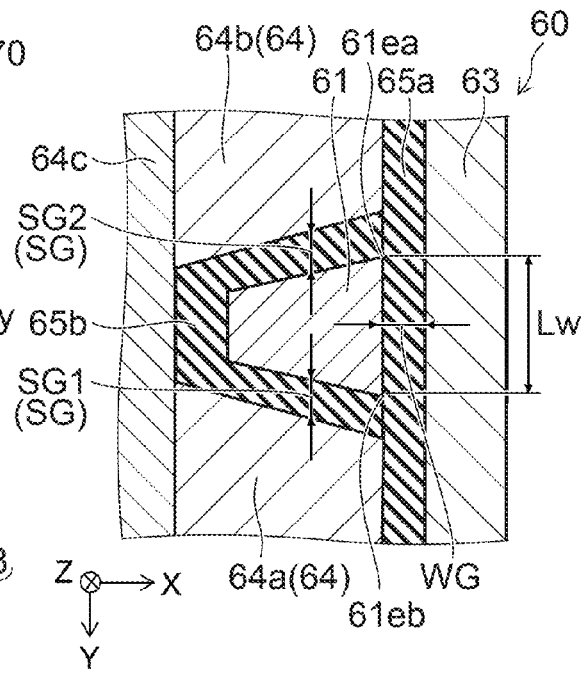
Figure 1C:
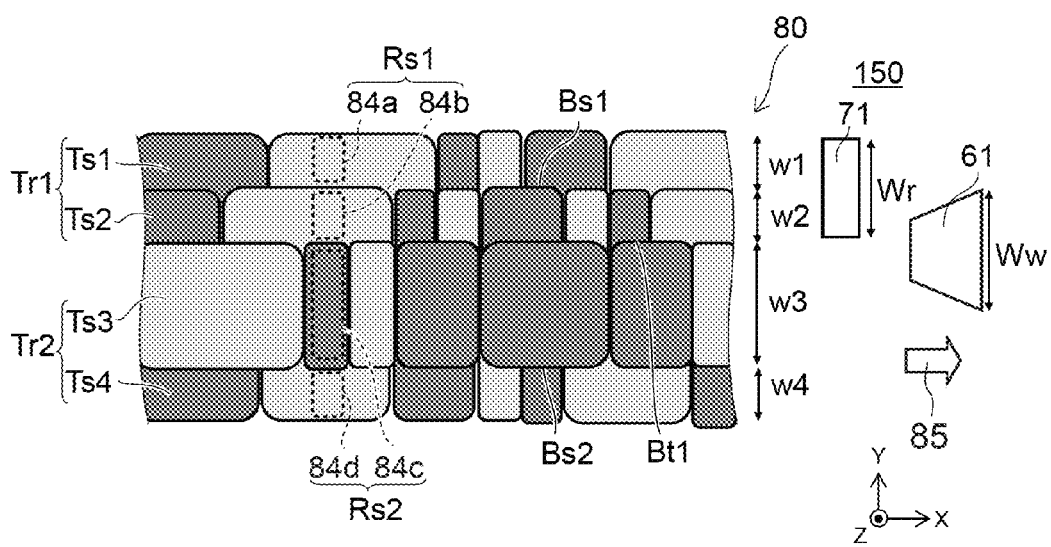

FIG. 1A to FIG. 1C are schematic plan views illustrating a magnetic recording and reproducing device according to a first embodiment.

Figure 2A:
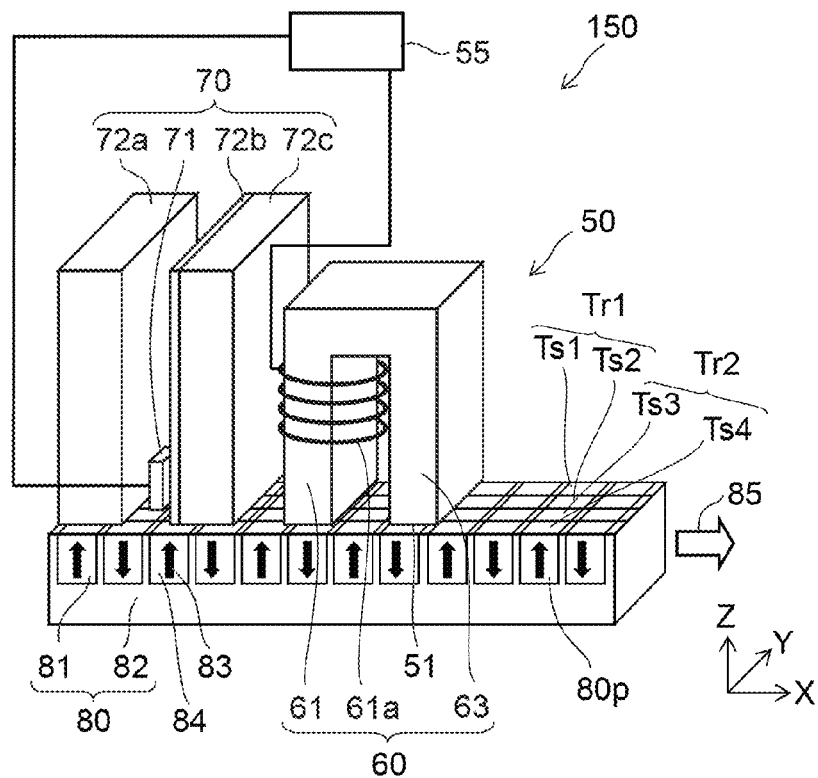
FIG. 2A and FIG. 2B are schematic views illustrating the magnetic recording and reproducing device according to the first embodiment.
Figure 2B:
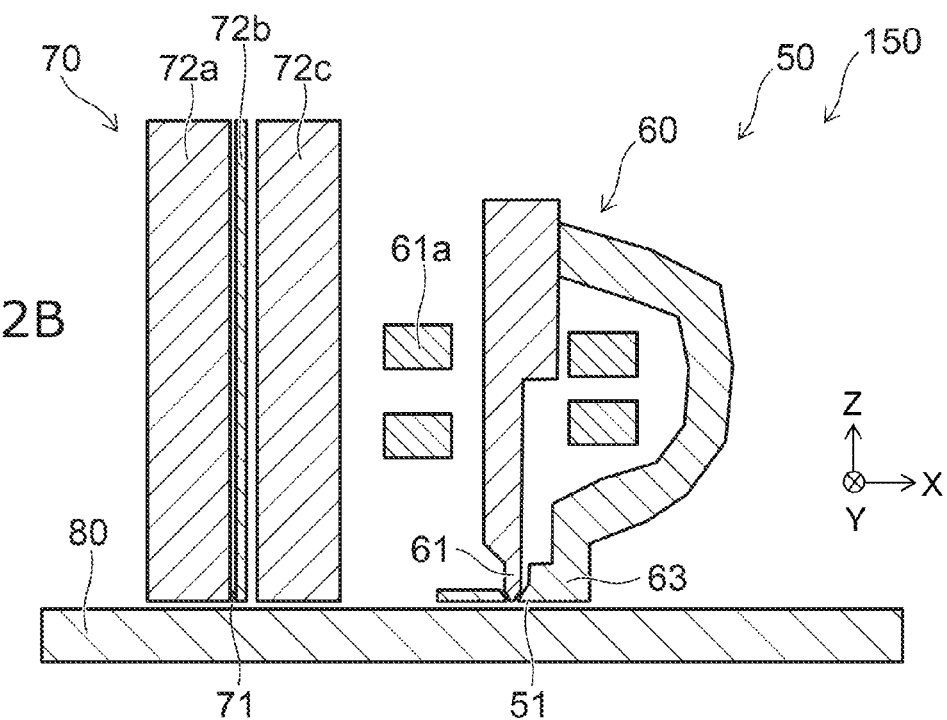

FIG. 2A and FIG. 2B are schematic views illustrating the magnetic recording and reproducing device according to the first embodiment.

FIG. 2A is a perspective view; and FIG. 2B is a cross-sectional view.

Figure 3:
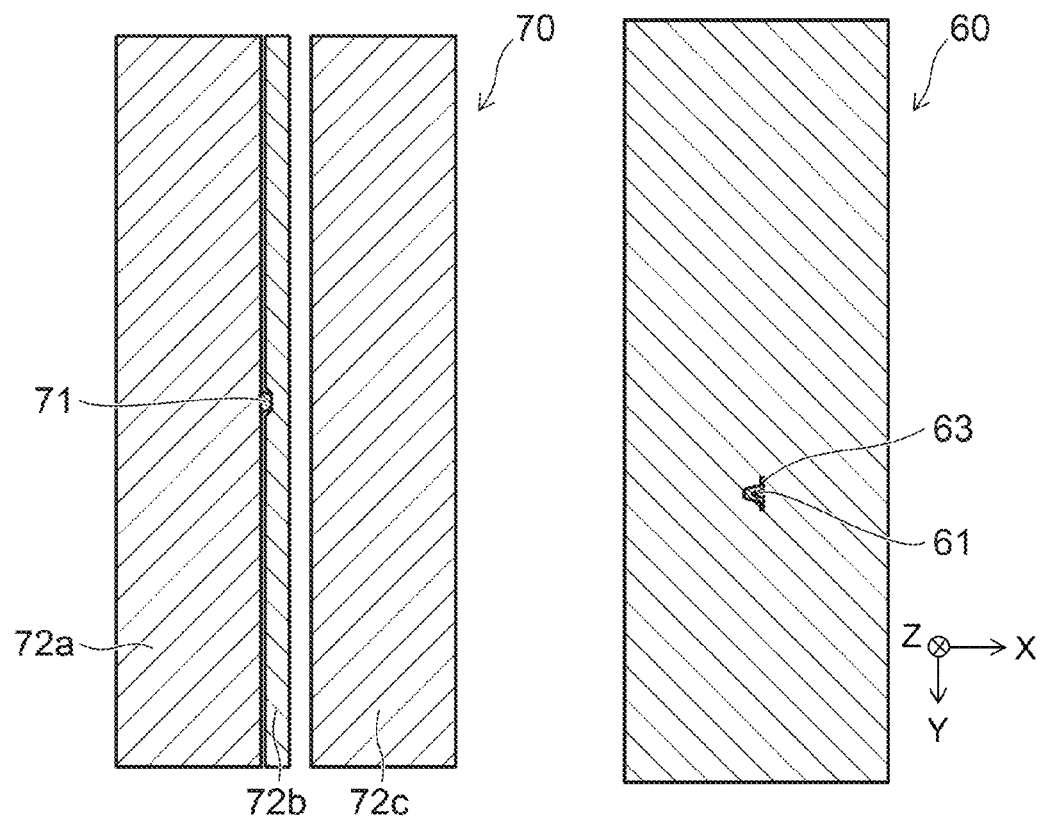
FIG. 3 is a schematic plan view illustrating the magnetic recording and reproducing device according to the first embodiment.

FIG. 3 is a schematic plan view illustrating the magnetic recording and reproducing device according to the first embodiment.

Figure 4:
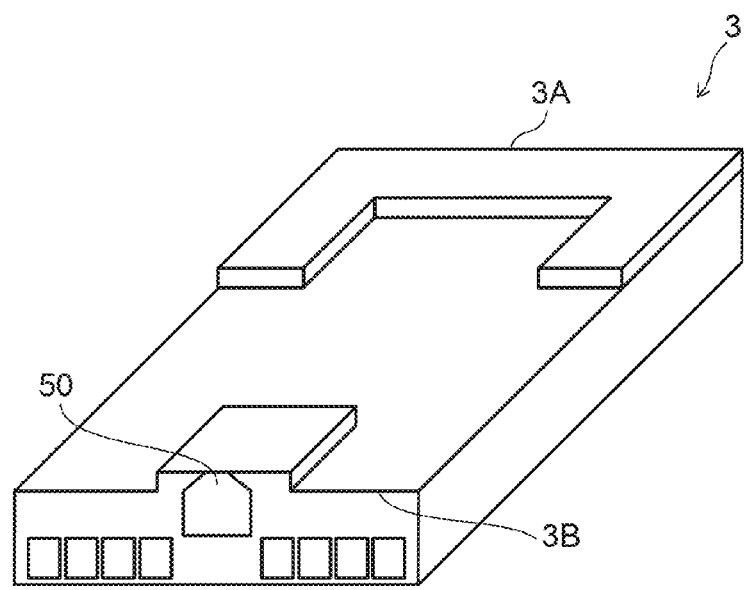
FIG. 4 is a schematic perspective view illustrating a portion of the magnetic recording and reproducing device according to the first embodiment.

FIG. 4 is a schematic perspective view illustrating a portion of the magnetic recording and reproducing device according to the first embodiment.

As shown in FIG. 2A and FIG. 2B, the magnetic recording and reproducing device 150 according to the embodiment includes a magnetic recording medium 80 and a magnetic head 50. The magnetic head 50 includes a recording unit 60 and a reproducing unit 70.

The magnetic head 50 is disposed to oppose the magnetic recording medium 80 (e.g., a magnetic disk, etc.). The magnetic head 50 has a medium-opposing surface 51 (Air Bearing Surface (ABS)). The medium-opposing surface 51 opposes the magnetic recording medium 80.

The magnetic recording medium 80 includes, for example, a medium substrate 82, and a magnetic recording layer 81 that is provided on the medium substrate 82. Multiple magnetic recording components 84 are provided in the magnetic recording layer 81. The magnetic recording medium 80 moves relative to the magnetic head 50 along a medium movement direction 85.

In the case where the magnetic recording medium 80 has a disk configuration as described below, the medium movement direction 85 is substantially aligned with the circumferential direction of the disk. Accordingly, the medium movement direction 85 with respect to the magnetic head 50 is substantially circular. When focusing on a narrow region, the medium movement direction 85 can be considered to be a substantially linear direction. The medium movement direction 85 is described as a direction along a straight line to simplify the description hereinbelow.

A magnetization 83 (the direction of the magnetization 83) of each of the multiple magnetic recording components 84 is controlled by a magnetic field applied from the recording unit 60 of the magnetic head 50. The magnetization 83 that is controlled is used as information. Thereby, the recording operation of the information is implemented.

In the embodiment, the magnetic recording medium 80 is, for example, a perpendicular magnetic recording medium. For example, the magnetization 83 intersects the surface of the medium substrate 82. For example, the magnetization 83 is substantially perpendicular to the surface of the medium substrate 82. For example, the magnetization 83 has the two states of upward or downward. For example, the direction from the magnetic recording medium 80 toward the recording unit 60 is upward. For example, the direction from the recording unit 60 toward the magnetic recording medium 80 is downward.

In the example, the recording unit 60 includes a magnetic pole 61, a recording coil 61a, and a write shield 63. As described below, a side shield (not shown in FIGS. 2A and 2B) is further provided in the recording unit 60. A magnetic field (a recording magnetic field) is generated from the magnetic pole 61 by the recording coil 61a. The magnetization 83 of the magnetic recording component 84 is controlled by the recording magnetic field. By providing the write shield 63, the strength of the recording magnetic field is increased; and the controllability is improved.

On the other hand, the information (the magnetization 83) that is recorded in the multiple magnetic recording components 84 is reproduced by the reproducing unit 70. Thereby, the reproduction operation is implemented.

In the example, the reproducing unit 70 includes a reproducing element 71, a first reproducing shield 72a, a second reproducing shield 72b, and a third reproducing shield 72c. The second reproducing shield 72b is disposed between the first reproducing shield 72a and the third reproducing shield 72c. The reproducing element 71 is disposed between the first reproducing shield 72a and the second reproducing shield 72b. The reproducing element 71 includes, for example, an element having a magnetoresistance effect, etc.

For example, the direction connecting the write shield 63 and the magnetic pole 61 is aligned with the medium movement direction 85.

A designated portion 80p of the magnetic recording medium 80 opposes the write shield 63 after opposing the magnetic pole 61.

The direction from the magnetic recording medium 80 toward the magnetic head 50 is taken as a Z-axis direction. One direction orthogonal to the Z-axis direction is taken as an X-axis direction. A direction orthogonal to the Z-axis direction and the X-axis direction is taken as a Y-axis direction.

The magnetic recording medium 80 includes multiple tracks (e.g., a first track Tr1, a second track Tr2, etc.). Each of the multiple tracks includes the multiple magnetic recording components 84. The multiple magnetic recording components 84 that are included in each of the multiple tracks are arranged along a down-track direction. The multiple tracks are arranged along a track width direction.

For example, the down-track direction is aligned with the X-axis direction. The down-track direction is parallel to the medium-opposing surface 51. The down-track direction is aligned with the direction from the magnetic pole 61 toward the write shield 63.

The track width direction is aligned with the Y-axis direction. The track width direction is parallel to the medium-opposing surface 51. The track width direction is perpendicular to the direction from the magnetic pole 61 toward the write shield 63.

As shown in FIG. 3, the position in the Y-axis direction of the reproducing unit 70 may be different from the position in the Y-axis direction of the recording unit 60.

In the embodiment as shown in FIG. 2A, each of the multiple tracks includes multiple sub-tracks. For example, the first track Tr1 includes a first sub-track Ts1 and a second sub-track Ts2. The second track Tr2 includes a third sub-track Ts3 and a fourth sub-track Ts4. Examples of the sub-tracks are described below.

A controller 55 is further provided in the magnetic recording and reproducing device 150. The controller 55 controls the operations of the recording unit 60. For example, the controller 55 acquires the information recorded in the magnetic recording medium 80 and generates the information relating to the state of each of the magnetic recording components 84 of the tracks provided in the magnetic recording medium 80. The controller 55 controls the operations of the recording unit 60 based on the generated information. The controller 55 may control the reproducing unit 70. The controller 55 may process the information reproduced by the reproducing unit 70.

FIG. 4 illustrates a head slider to which the magnetic head 50 is mounted.

The magnetic head 50 is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic head 50 is disposed at the side surface of the air outflow side 3B of the head slider 3 or the like. Thereby, the magnetic head 50 that is mounted to the head slider 3 moves relative to the magnetic recording medium 80 while flying over or contacting the magnetic recording medium 80.

For example, the magnetic head 50 according to the embodiment may perform the operation of recording the information in the magnetic recording medium 80 by shingled magnetic recording (SMR).

FIG. 1A is a plan view illustrating the reproducing unit 70 provided in the magnetic head 50. FIG. 1B is a plan view illustrating the recording unit 60 provided in the magnetic head 50. FIG. 1A and FIG. 1B are plan views as viewed from the medium-opposing surface 51. FIG. 1C is a plan view illustrating the magnetic recording medium 80.

The third reproducing shield 72c is not shown in FIG. 1A. As shown in FIG. 1A, the reproducing element 71 is provided in the reproducing unit 70 between the first reproducing shield 72a and the second reproducing shield 72b. In the example, the second reproducing shield 72b includes a first shield film 75, a second shield film 76, a third shield film 77, and a fourth shield film 78. The first shield film 75 is provided between the fourth shield film 78 and the first reproducing shield 72a. The second shield film 76 is provided between the first shield film 75 and the fourth shield film 78. The third shield film 77 is provided between the second shield film 76 and the fourth shield film 78.

The first shield film 75 includes, for example, NiFe. The second shield film 76 includes, for example, Ru. The third shield film 77 includes, for example, NiFe. The fourth shield film 78 includes, for example, IrMn. The first reproducing shield 72a includes, for example, NiFe. The third reproducing shield 72c includes, for example, NiFe, an FeCoNi alloy, etc.

An insulating layer 71i is provided in the region between the first reproducing shield 72a and the second reproducing shield 72b where the reproducing element 71 is not provided.

The reproducing element 71 includes, for example, a first electrode 71e, a second electrode 71f, a first magnetic layer 71a, a second magnetic layer 71b, a third magnetic layer 71c, and an intermediate layer 71d. The first electrode 71e is provided between the first reproducing shield 72a and the second reproducing shield 72b. The second electrode 71f is provided between the first electrode 71e and the second reproducing shield 72b. The first magnetic layer 71a is provided between the first electrode 71e and the second electrode 71f. The second magnetic layer 71b is provided between the first electrode 71e and the first magnetic layer 71a. The third magnetic layer 71c is provided between the first electrode 71e and the second magnetic layer 71b. The intermediate layer 71d is provided between the first magnetic layer 71a and the second magnetic layer 71b. The first magnetic layer 71a is, for example, a free magnetic layer. The third magnetic layer 71c is an antiferromagnetic layer. The second magnetic layer 71b is a fixed magnetic layer. In the embodiment, the second magnetic layer 71b may be a free magnetic layer.

The reproducing element 71 has a reproducing element width Wry.

The reproducing element width Wry is the width in a second direction (the Y-axis direction) of the first magnetic layer 71a. There are cases where the side surface of the first magnetic layer 71a is tilted with respect to the X-axis direction. Thus, in the case where the side surface of the first magnetic layer 71a has a tapered configuration, the reproducing element width Wry is taken as the width in the Y-axis direction of the first magnetic layer 71a at the position of the center of the first magnetic layer 71a in the X-axis direction.

As shown in FIG. 1B, the recording unit 60 includes the magnetic pole 61, the write shield 63, and a side shield 64.

In the example, the side shield 64 includes a first side shield 64a and a second side shield 64b.

The write shield 63 is separated from the magnetic pole 61 in a first direction (e.g., the X-axis direction). The side shield 64 is separated from the magnetic pole 61 in the second direction (the Y-axis direction). The first side shield 64a is separated from the magnetic pole 61 in the second direction. The second side shield 64b is separated from the magnetic pole 61 in the second direction. The magnetic pole 61 is disposed between the first side shield 64a and the second side shield 64b. For example, the position in the X-axis direction of the magnetic pole 61 is disposed between the position in the X-axis direction of the write shield 63 and the position in the X-axis direction of the reproducing unit 70.

In the example, the recording unit 60 further includes a return shield 64c. The magnetic pole 61, the first side shield 64a, and the second side shield 64b are disposed between the return shield 64c and the write shield 63.

A first insulating layer 65a is provided between the magnetic pole 61 and the write shield 63. A second insulating layer 65b is provided at the position between the magnetic pole 61 and the first side shield 64a, the position between the magnetic pole 61 and the second side shield 64b, and the position between the magnetic pole 61 and the return shield 64c. The insulating layers include, for example, aluminum oxide, etc.

The recording unit 60 of the magnetic head 50 has a write gap WG. The write gap WG is the spacing along the first direction (the X-axis direction) between the magnetic pole 61 and the write shield 63.

A side gap SG is the spacing along the second direction (the Y-axis direction) between the magnetic pole 61 and the side shield 64. A first side gap SG1 is the spacing along the second direction (the Y-axis direction) between the magnetic pole 61 and the first side shield 64a. A second side gap SG2 is the spacing along the second direction (the Y-axis direction) between the magnetic pole 61 and the second side shield 64b. The side gap SG is one of the first side gap SG1 or the second side gap SG2. For example, the first side gap SG1 is substantially the same as the second side gap SG2. For example, the first side gap SG1 may be not less than 0.8 times and not more than 1.2 times the second side gap SG2. In the embodiment, the first side gap SG1 may be different from the second side gap SG2. The average of the first side gap SG1 and the second side gap SG2 may be used as the side gap SG.

A magnetic pole width Lw is the width in the Y-axis direction (the second direction) of the magnetic pole 61. The magnetic pole width Lw is the maximum value of the length along the second direction (the Y-axis direction) of the magnetic pole 61 in the medium-opposing surface 51.

The magnetic pole 61 includes a portion that opposes the write shield 63 at the medium-opposing surface 51. A first magnetic pole end portion 61ea is the end of this portion on the first side shield 64a side. A second magnetic pole end portion 61eb is the end of this portion on the second side shield 64b side. The distance (the distance along the Y-axis direction) between the first magnetic pole end portion 61ea and the second magnetic pole end portion 61eb corresponds to the magnetic pole width Lw.

The recording unit 60 has a recording width Ww. The recording width Ww corresponds to the distance between the midpoint between the first magnetic pole end portion 61ea and the first side shield 64a and the midpoint between the second magnetic pole end portion 61eb and the second side shield 64b. Accordingly, the recording width Ww substantially corresponds to the sum of the magnetic pole width Lw and the side gap SG.

As shown in FIG. 1C, the magnetic recording medium 80 includes the first track Tr1 and the second track Tr2.

The first track Tr1 extends in the first direction (e.g., the X-axis direction). The second track Tr2 also extends in the first direction. The second track Tr2 is arranged with the first track Tr1 in the second direction. The second direction is a direction (e.g., the Y-axis direction) intersecting the first direction.

The first track Tr1 includes the first sub-track Ts1 that extends in the first direction, and the second sub-track Ts2 that extends in the first direction.

The second track Tr2 includes the third sub-track Ts3 that extends in the first direction, and the fourth sub-track Ts4 that extends in the first direction.

The second sub-track Ts2 is disposed between the first sub-track Ts1 and the fourth sub-track Ts4. The third sub-track Ts3 is disposed between the second sub-track Ts2 and the fourth sub-track Ts4.

The first sub-track Ts1 has a width (a first sub-track width w1) along the second direction (e.g., the Y-axis direction). The second sub-track Ts2 has a width (a second sub-track width w2) along the second direction (e.g., the Y-axis direction). The third sub-track Ts3 has a width (a third sub-track width w3) along the second direction (e.g., the Y-axis direction).

The fourth sub-track Ts4 has a width (a fourth sub-track width w4) along the second direction (e.g., the Y-axis direction).

In the example, the third sub-track width w3 is wider than the first sub-track width w1, wider than the second sub-track width w2, and wider than the fourth sub-track width w4.

The recording unit 60 records the information in the first track Tr1 and the second track Tr2. The reproducing unit 70 reproduces the information recorded in the first track Tr1 and the information recorded in the second track Tr2. The reproducing unit 70 reproduces first information recorded in the first track Tr1 while opposing the first sub-track Ts1, the second sub-track Ts2, and a first boundary Bs1 between the first sub-track Ts1 and the second sub-track Ts2.

The reproducing unit 70 reproduces second information recorded in the second track Tr2 while opposing the third sub-track Ts3, the fourth sub-track Ts4, and a second boundary Bs2 between the third sub-track Ts3 and the fourth sub-track Ts4. In the embodiment, a boundary Bt1 between the first track Tr1 and the second track Tr2 corresponds to the boundary between the second sub-track Ts2 and the third sub-track Ts3.

Ternary information is recorded in the first track Tr1 using the first sub-track Ts1 and the second sub-track Ts2. For example, the first sub-track Ts1 includes a first recording component 84a; and the second sub-track Ts2 includes a second recording component 84b. The second recording component 84b is arranged with the first recording component 84a in the second direction (the Y-axis direction). One recording symbol (a first recording symbol Rs1) is formed of the first recording component 84a and the second recording component 84b.

Ternary information is recorded in the second track Tr2 using the third sub-track Ts3 and the fourth sub-track Ts4. For example, the third sub-track Ts3 includes a third recording component 84c. The fourth sub-track Ts4 includes a fourth recording component 84d. The fourth recording component 84d is arranged with the third recording component 84c in the second direction (the Y-axis direction). One recording symbol (a second recording symbol Rs2) is formed of the third recording component 84c and the fourth recording component 84d.

The first recording component 84a is one of the multiple magnetic recording components 84 included in the first sub-track Ts1. The second recording component 84b is one of the multiple magnetic recording components 84 included in the second sub-track Ts2. The third recording component 84c is one of the multiple magnetic recording components 84 included in the third sub-track Ts3. The fourth recording component 84d is one of the multiple magnetic recording components 84 included in the fourth sub-track Ts4.

The length in the first direction (the X-axis direction) of one of the multiple magnetic recording components 84 (the multiple recording components) is, for example, not less than 5 nanometers (nm) and not more than 20 nm. A length L in the first direction (the X-axis direction) of the one of the multiple recording symbols is, for example, not less than 5 nm and not more than 20 nm.

FIG. 5A to FIG. 5H are schematic views illustrating states of the magnetic recording medium included in the magnetic recording and reproducing device according to the first embodiment.

These drawings illustrate the states of the first to fourth recording components 84a to 84d.

Figures 5A, 5B, 5C, 5D:
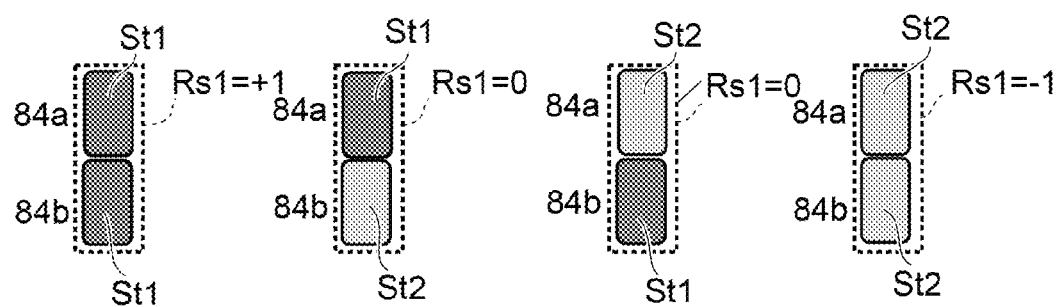
FIG. 5A to FIG. 5H are schematic views illustrating states of the magnetic recording medium included in the magnetic recording and reproducing device according to the first embodiment.

As shown in FIG. 5A, the first recording symbol Rs1 has a first value when the magnetization 83 of the first recording component 84a is in a first state St1 and the magnetization 83 of the second recording component 84b is in the first state St1. In the example, the first value is "+1."

As shown in FIG. 5D, the first recording symbol Rs1 has a second value when the magnetization 83 of the first recording component 84a is in a second state St2 and the magnetization 83 of the second recording component 84b is in the second state St2. In the example, the second value is "−1."

As shown in FIG. 5B, the first recording symbol Rs1 has a third value when the magnetization 83 of the first recording component 84a is in the first state St1 and the magnetization 83 of the second recording component 84b is in the second state St2. In the example, the third value is "0."

As shown in FIG. 5C, the first recording symbol Rs1 has the third value (i.e., "0") when the magnetization 83 of the first recording component 84a is in the second state St2 and the magnetization 83 of the second recording component 84b is in the first state St1.

Figures 5E, 5F, 5G, 5H:
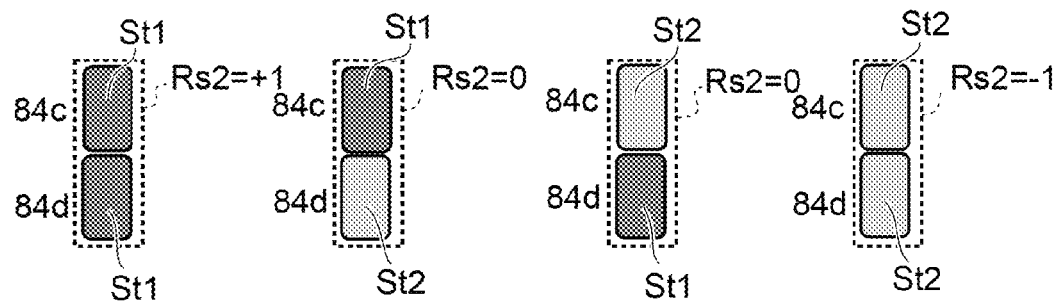

As shown in FIG. 5E, the second recording symbol Rs2 has the first value (e.g., "+1") when the magnetization 83 of the third recording component 84c is in the first state St1 and the magnetization 83 of the fourth recording component 84d is in the first state St1.

As shown in FIG. 5H, the second recording symbol Rs2 has the second value (e.g., "−1") when the magnetization 83 of the third recording component 84c is in the second state St2 and the magnetization 83 of the fourth recording component 84d is in the second state St2.

As shown in FIG. 5F, the second recording symbol Rs2 has the third value (e.g., "0") when the magnetization 83 of the third recording component 84c is in the first state St1 and the magnetization 83 of the fourth recording component 84d is in the second state St2.

As shown in FIG. 5G, the second recording symbol Rs2 has the third value (e.g., "0") when the magnetization 83 of the third recording component 84c is in the second state St2 and the magnetization 83 of the fourth recording component 84d is in the first state St1.

In the first state St1, the magnetization 83 is, for example, one of upward (the direction from the magnetic recording medium 80 toward the recording unit 60) or downward (the direction from the recording unit 60 toward the magnetic recording medium 80). In the second state St2, the magnetization 83 is, for example, the other of upward or downward.

For example, the direction of the magnetization 83 in the first state St1 intersects a surface (e.g., the X-Y plane) including the first direction and the second direction. The direction of the magnetization 83 in the second state St2 intersects a surface (e.g., the X-Y plane) including the first direction and the second direction. The direction of the first magnetization in the second state St2 is the reverse of the direction of the first magnetization in the first state St1.

Thus, the state of one first recording symbol Rs1 is determined by the combination of the state of the magnetization 83 of the multiple magnetic recording components 84 included in the first sub-track Ts1 and the state of the magnetization 83 of the multiple magnetic recording components 84 included in the second sub-track Ts2. In the example, one first recording symbol Rs1 has three mutually-different states (values). Similarly, the state of one second recording symbol Rs2 is determined by the combination of the state of the magnetization 83 of the multiple magnetic recording components 84 included in the third sub-track Ts3 and the state of the magnetization 83 of the multiple magnetic recording components 84 included in the fourth sub-track Ts4. In the example, one second recording symbol Rs2 has three mutually-different states (values). The control of the state of the magnetization 83 of the sub-track when recording the information to the magnetic recording components 84 is performed by the recording unit 60. For example, the operation of the recording unit 60 at this time is controlled by the controller 55.

For example, the recording of information such as that shown in FIG. 1C is performed by the recording unit 60 using shingled magnetic recording (SMR). An example of the method for recording the information will now be described.

FIG. 6A to FIG. 6D are schematic views illustrating operations of the magnetic recording and reproducing device according to the first embodiment.

Figure 6A:
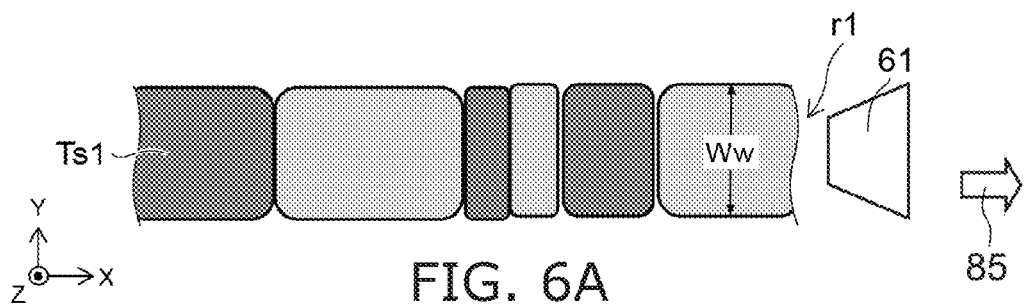
FIG. 6A to FIG. 6D are schematic views illustrating operations of the magnetic recording and reproducing device according to the first embodiment.

As shown in FIG. 6A, first sub-information is recorded in a first region r1 of the magnetic recording medium 80. The first region r1 is the position corresponding to the first sub-track Ts1. The first sub-information includes a portion of the information corresponding to the information to be recorded in the first track Tr1. For example, the information is recorded in the first region r1 of the magnetic recording medium 80 by the recording unit 60 (the magnetic pole 61). The recording of the information is performed along the X-axis direction. The width in the Y-axis direction of the first region r1 substantially corresponds to the recording width Ww.

Figure 6B:
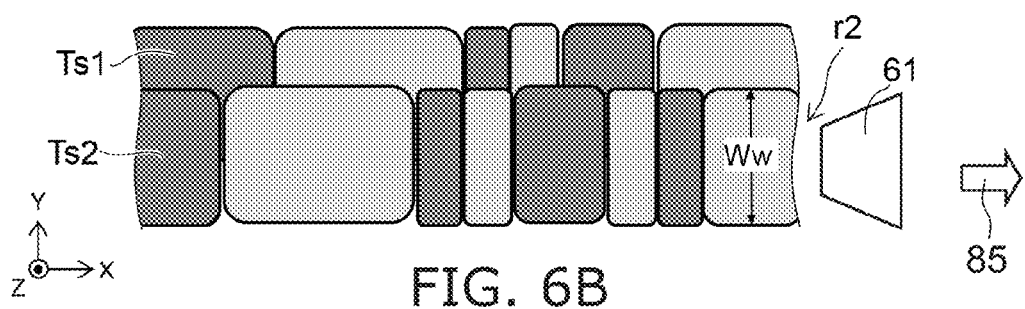

Subsequently, as shown in FIG. 6B, second sub-information is recorded in a second region r2 of the magnetic recording medium 80. The second region r2 is the position corresponding to the second sub-track Ts2. The second region r2 overlaps a portion of the first region r1. The second sub-information includes a portion of the information corresponding to the information to be recorded in the first track Tr1. The width in the Y-axis direction of the second region r2 substantially corresponds to the recording width Ww. For example, shingled magnetic recording (SMR) is performed. Thereby, the second region r2 overlaps a portion of the first region r1.

Figure 6C:
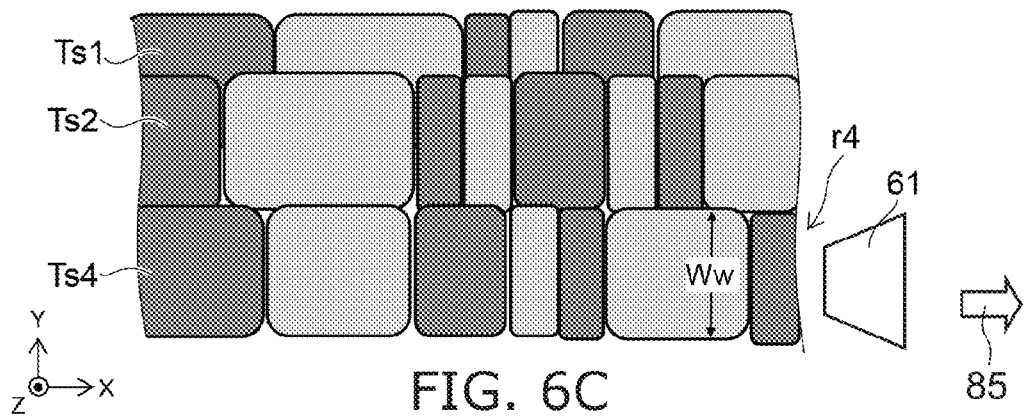

Subsequently, as shown in FIG. 6C, fourth sub-information is recorded in a fourth region r4 of the magnetic recording medium 80. The fourth region r4 is the position corresponding to the fourth sub-track Ts4. The fourth sub-information includes a portion of the information corresponding to the information to be recorded in the second track Tr2. The width in the Y-axis direction of the fourth region r4 substantially corresponds to the recording width Ww.

Figure 6D:
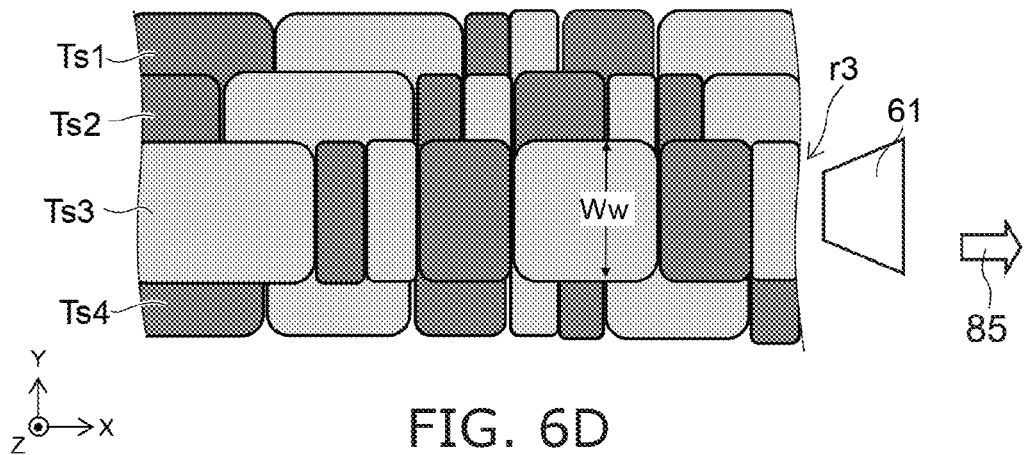

Subsequently, as shown in FIG. 6D, third sub-information is recorded in a third region r3 of the magnetic recording medium 80. The third region r3 is the position corresponding to the third sub-track Ts3. The third region r3 overlaps a portion of the fourth region r4. The third sub-information includes a portion of the information corresponding to the information to be recorded in the second track Tr2. The width in the Y-axis direction of the third region r3 substantially corresponds to the recording width Ww. For example, shingled magnetic recording (SMR) is performed. Thereby, the third region r3 overlaps a portion of the fourth region r4. The third region r3 and a portion of the second region r2 may overlap.

In other words, the information is recorded in the first sub-track Ts1 and the second sub-track Ts2 by a first shingled magnetic recording. The information is recorded in the third sub-track Ts3 and the fourth sub-track Ts4 by a second shingled magnetic recording. In the embodiment, the direction of the shift of the first shingled magnetic recording and the direction of the shift of the second shingled magnetic recording are the reverse of each other. A portion of the third sub-track Ts3 overlaps a portion of a region for the second sub-track Ts2.

The second region r2 is the region where the second sub-information is recorded. The third region r3 is the region where the third sub-information is recorded. The recording density in the Y-axis direction can be increased by a portion of such a third region r3 overlapping a portion of the second region r2. Thereby, a magnetic recording and reproducing device in which higher recording density is possible can be provided.

As shown in FIG. 1C, the first sub-track Ts1 substantially contacts the second sub-track Ts2. The third sub-track Ts3 substantially contacts the second sub-track Ts2. The fourth sub-track Ts4 substantially contacts the third sub-track Ts3.

In other words, the distance (e.g., the shortest distance) between the first sub-track Ts1 and the fourth sub-track Ts4 corresponds to the sum of the second sub-track width w2 and the third sub-track width w3. Considering the fluctuation of the boundary of the sub-tracks, etc., the distance between the first sub-track Ts1 and the fourth sub-track Ts4 is not less than 0.8 times and not more than 1.2 times the sum of the second sub-track width w2 and the third sub-track width w3. The distance may be not less than 0.9 times and not more than 1.1 times the sum of the second sub-track width w2 and the third sub-track width w3. The distance may be not less than 0.95 times and not more than 1.05 times the sum of the second sub-track width w2 and the third sub-track width w3.

On the other hand, as recited above, the information is reproduced by the reproducing unit 70 that simultaneously opposes the first sub-track Ts1, the second sub-track Ts2, and the boundary between the first sub-track Ts1 and the second sub-track Ts2. When increasing the recording density, the sum of the first sub-track width w1 and the second sub-track width w2 substantially corresponds to a reproducing width Wr of the reproducing unit 70.

Considering the fluctuation of the positioning control in the Y-axis direction of the reproducing unit 70 when reproducing, it is desirable for the reproducing width Wr to be not less than 1.6 times and not more than 3 times the reproducing element width Wry. When the reproducing width Wr is less than 1.6 times the reproducing element width Wry, the error rate degrades due to insufficient positioning control. As a result, many retries of the reproduction operation occur; and the transfer speed performance degrades. When the reproducing width Wr exceeds 3 times the reproducing element width Wry, the recording density becomes insufficient.

Considering the fluctuation of the boundary of the sub-tracks, etc., the sum of the first sub-track width w1 and the second sub-track width w2 is not less than 0.9 times and not more than 1.1 times the reproducing width Wr. The sum may be not less than 0.95 times and not more than 1.05 times the reproducing width Wr.

On the other hand, in the example, the third sub-track Ts3 is recorded last. Accordingly, the third sub-track width w3 of the third sub-track Ts3 substantially corresponds to the recording width Ww of the recording unit 60. Considering the fluctuation of the boundary of the sub-tracks, the third sub-track width w3 is not less than 0.9 times and not more than 1.1 times the recording width Ww. The third sub-track width w3 may be not less than 0.95 times and not more than 1.05 times the recording width Ww.

Figure 7A:
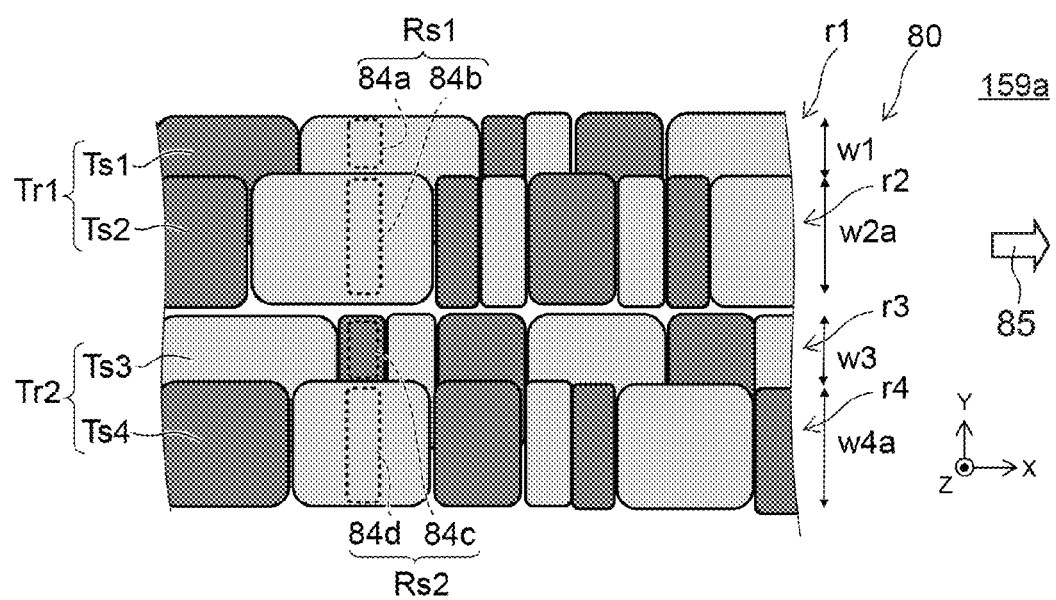
FIG. 7A and FIG. 7B are schematic views illustrating operations of magnetic recording and reproducing devices.
Figure 7B:
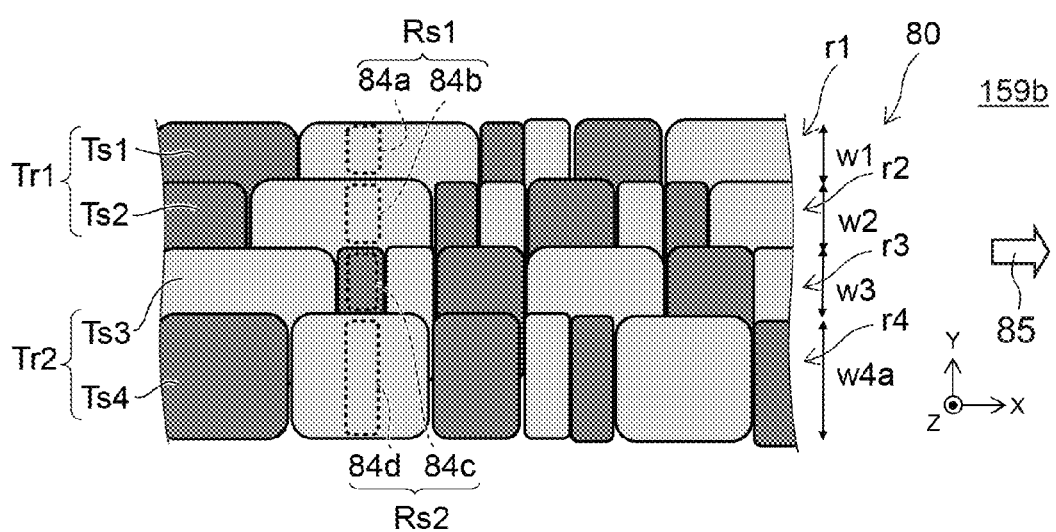

FIG. 7A and FIG. 7B are schematic views illustrating operations of magnetic recording and reproducing devices.

Ternary magnetic recording is performed in a magnetic recording and reproducing device 159a of a reference example as shown in FIG. 7A. In the example, recording by shingled magnetic recording is performed for the first track Tr1 so that a portion of the second region r2 (the region where the second sub-information corresponding to the second sub-track Ts2 is recorded) overlaps a portion of the first region r1 (the region where the first sub-information corresponding to the first sub-track Ts1 is recorded). Recording by shingled magnetic recording is performed for the second track Tr2 so that a portion of the fourth region r4 (the region where the fourth sub-information corresponding to the fourth sub-track Ts4 is recorded) overlaps a portion of the third region r3 (the region where the third sub-information corresponding to the third sub-track Ts3 is recorded). In the example, the first track Tr1 and the second track Tr2 do not overlap. In other words, for example, the second track Tr2 is separated from the first track Tr1. In such a case, the width in the Y-axis direction occupied by the first track Tr1 and the second track Tr2 is not less than the width of w1+w2a+w3+w4a. The widths w2a and w4a correspond to the recording width Ww. Therefore, the recording density of the recording method of the magnetic recording and reproducing device 159a is lower than the recording density of the embodiment.

Ternary magnetic recording is performed in a magnetic recording and reproducing device 159b of a reference example as shown in FIG. 7B. In the example, recording by shingled magnetic recording is performed so that a portion of the second region r2 (the region where the second sub-information corresponding to the second sub-track Ts2 is recorded) overlaps a portion of the first region r1 (the region where the first sub-information corresponding to the first sub-track Ts1 is recorded). Further, the recording by shingled magnetic recording is performed so that a portion of the third region r3 (the region where the third sub-information corresponding to the third sub-track Ts3 is recorded) overlaps a portion of the second region r2 (the region where the second sub-information corresponding to the second sub-track Ts2 is recorded). Further, recording by shingled magnetic recording is performed so that a portion of the fourth region r4 (the region where the fourth sub-information corresponding to the fourth sub-track Ts4 is recorded) overlaps a portion of the third region r3 (the region where the third sub-information corresponding to the third sub-track Ts3 is recorded). In such a case, the width in the Y-axis direction occupied by the first track Tr1 and the second track Tr2 is the width of w1+w2+w3+w4a. The width w4a corresponds to the recording width Ww. The recording density of the recording method of the magnetic recording and reproducing device 159b may be equal to the recording density of the embodiment.

However, in the recording method of the magnetic recording and reproducing device 159b, the order of the sub-tracks that are recorded is in a single direction. Therefore, the information that is recorded in the first track Tr1 cannot be modified while maintaining the information recorded in the second track Tr2. If the information recorded in the first track Tr1 is modified, for example, the second region r2 that records the second sub-information overlaps a portion of the third sub-track Ts3 due to the modification of the information of the second sub-track Ts2. Thus, in the recording method of the magnetic recording and reproducing device 159b, the order of the sub-tracks that are recorded is in a single direction. Random recording (overwriting) cannot be performed. To perform random overwriting while maintaining the order of the sub-tracks that are recorded in the single direction, the first track Tr1 and the second track Tr2 cannot be overlaid; and as a result, the method described in regard to the magnetic recording and reproducing device 159a is used.

Conversely, random overwriting is possible in the magnetic recording and reproducing device 150 according to the embodiment. An example of the overwriting of the information will now be described.

Figure 8A:
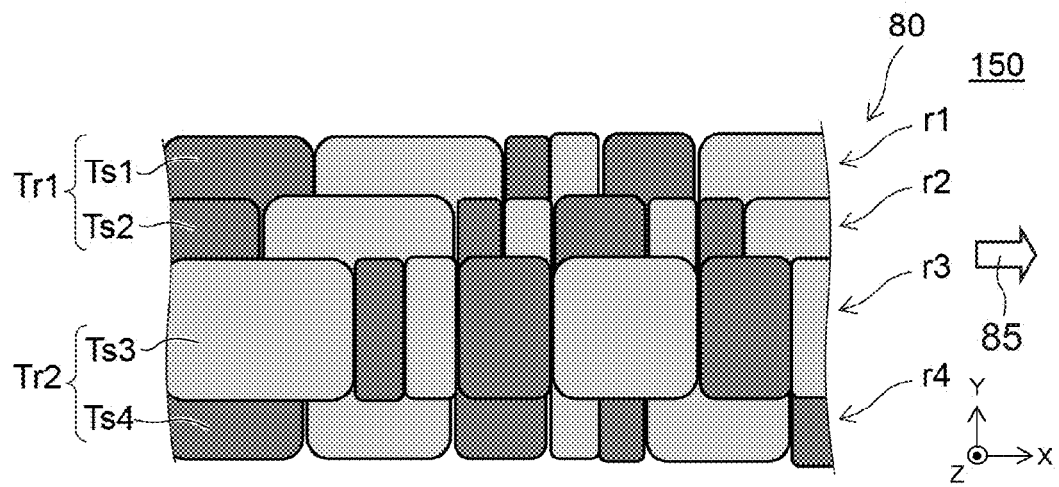
FIG. 8A to FIG. 8C are schematic views illustrating operations of the magnetic recording and reproducing device according to the first embodiment.
Figure 8B:
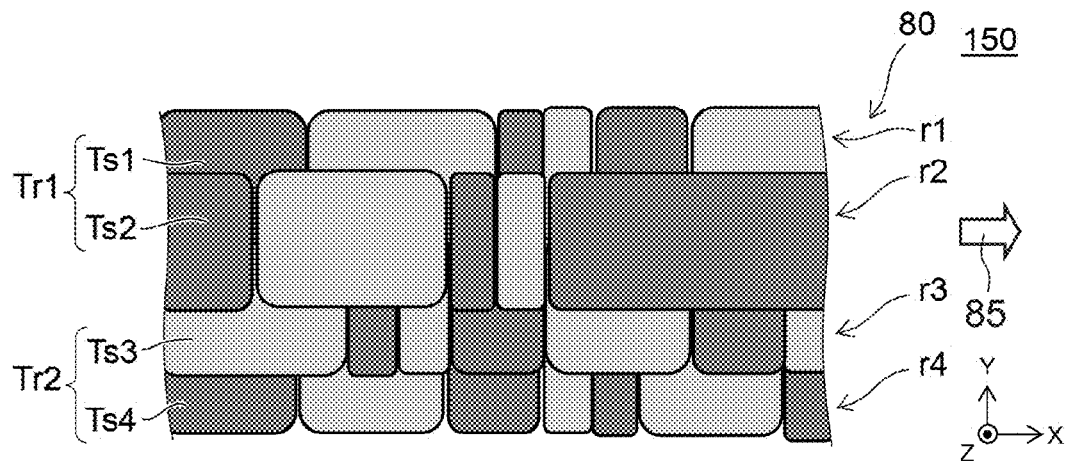
Figure 8C:
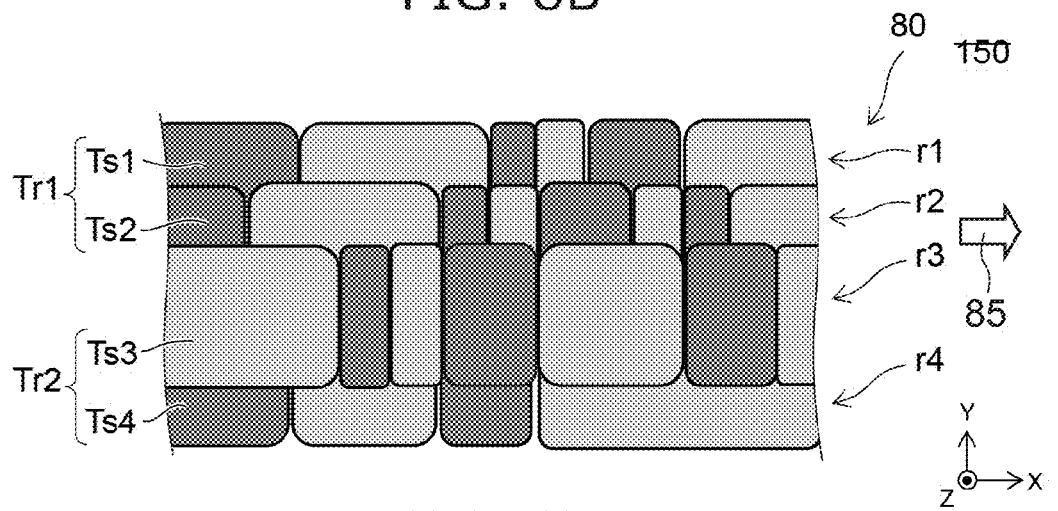

FIG. 8A to FIG. 8C are schematic views illustrating operations of the magnetic recording and reproducing device according to the first embodiment.

The state shown in FIG. 8A is taken to be the initial state.

In the example shown in FIG. 8B, the information of the first track Tr1 is overwritten while maintaining the information of the second track Tr2 in the initial state. For example, the desired sub-information is recorded in the first region r1 (the region where the first sub-information corresponding to the first sub-track Ts1 is recorded). Subsequently, the desired sub-information is recorded by shingled magnetic recording in the second region r2 (the region where the second sub-information corresponding to the second sub-track Ts2 is recorded). At this time, the information of the second track Tr2 is maintained in the initial state.

In the example shown in FIG. 8C, the information of the second track Tr2 is overwritten while maintaining the information of the first track Tr1 in the initial state. For example, the desired sub-information is recorded in the fourth region r4 (the region where the fourth sub-information corresponding to the fourth sub-track Ts4 is recorded). Subsequently, the desired sub-information is recorded by shingled magnetic recording in the third region r3 (the region where the third sub-information corresponding to the third sub-track Ts3 is recorded). At this time, the information of the first track Tr1 is maintained in the initial state.

Thus, in the magnetic recording and reproducing device 150 according to the embodiment, random overwriting is possible while obtaining a high recording density.

Figure 9A:
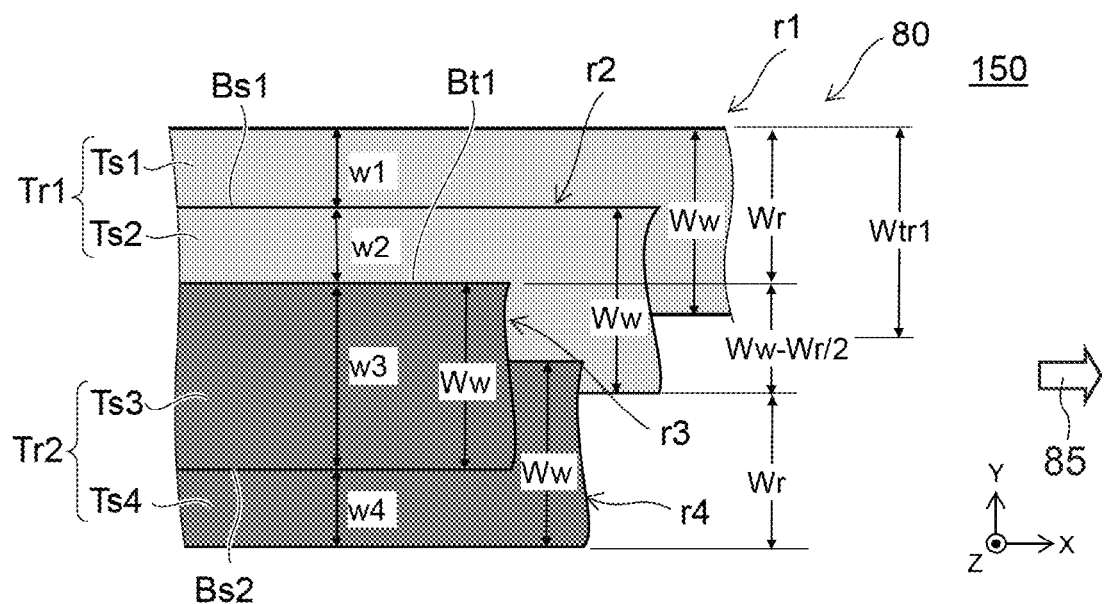
FIG. 9A and FIG. 9B are schematic views illustrating an operation of the magnetic recording medium of the magnetic recording and reproducing device.
Figure 9B:
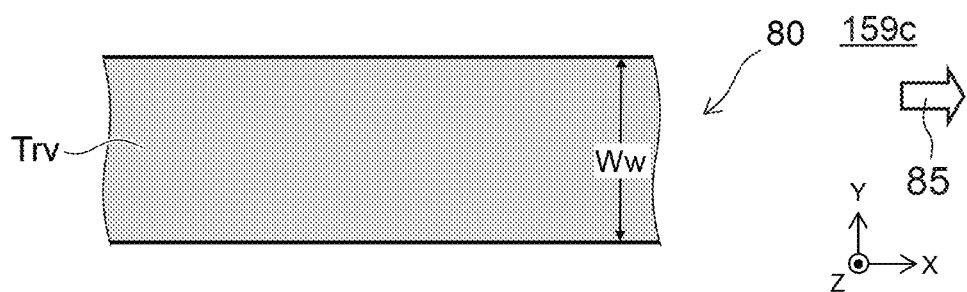

FIG. 9A and FIG. 9B are schematic views illustrating an operation of the magnetic recording medium of the magnetic recording and reproducing device.

FIG. 9A shows an example of the relationship between the width of the sub-track, the recording width Ww, and the reproducing width Wr of the magnetic recording and reproducing device 150 according to the embodiment. For example, the total of the first sub-track width w1 and the second sub-track width w2 corresponds to the reproducing width Wr. In the example, the third region r3 (the region where the third sub-information corresponding to the third sub-track Ts3 is recorded) overlaps a portion of the second region r2 (the region where the second sub-information corresponding to the second sub-track Ts2 is recorded). The width of the overlap is, for example, Ww−Wr/2. The second track Tr2 includes a region (a non-superimposed region) that does not overlap the second region r2 (the region where the second sub-information corresponding to the second sub-track Ts2 is recorded). The width of the non-superimposed region of the second track Tr2 recited above is, for example, the reproducing width Wr. Thereby, random overwriting is possible for the first track Tr1 and the second track Tr2. When the first track Tr1 is overwritten, the record of the non-superimposed region portion recited above is maintained as-is without being overwritten. Therefore, for example, random overwriting of the first track Tr1 and the second track Tr2 is possible by setting the width of the non-superimposed region recited above to the reproducing width Wr.

In such a case, the width occupied by the first to fourth sub-tracks Ts1 to Ts4 is 2Wr+(Ww−Wr/2). In such a case, an effective width Wrt1 of one track (e.g., the first track Tr1) is Wr+(Ww−Wr/2)/2. Accordingly, the effective width Wrt1 of the first track Tr1 is not less than Wr+(Ww−Wr/2)/2.

FIG. 9B illustrates one track Try for binary recording. The width of the track Try is the recording width Ww.

In the embodiment, for example, the linear recording density of the first track Tr1 performing ternary recording is higher than the linear recording density of the track Try performing binary recording. For the same spacing of the magnetization transition of the first direction that determines the linear recording density, the first track Tr1 performing ternary recording records three values (i.e., 1.5 bits) in one recording symbol. Conversely, the track Try performing binary recording records one bit. The linear recording density of the embodiment can be high by setting the linear recording density of the first track Tr1 performing ternary recording to be higher than the linear recording density of the track Try performing binary recording.

A gain G3 is the gain of the BPI (bit/inch) of ternary recording with respect to the BPI of binary recording. According to investigations of the inventor, the gain G3 is, for example, 1.08 or more. The gain G3 is, for example, not more than about 1.2.

A recording capacity gain AG is the gain of the surface recording density of ternary recording with respect to the surface recording density of binary recording for the embodiment. The recording capacity gain AG is (track width of binary recording/effective width of ternary recording=effective width=Ww/Wtr1)×gain G3. In the embodiment, the recording capacity gain AG is greater than 1.

In other words, the reproducing width Wr and the recording width Ww satisfy the following relationship.

$$AG = (Wr/\{Wr + (Ww - Wr/2)/2\}) \cdot 1.08 > 1$$

In such a case, the effective surface recording density of ternary recording of the embodiment is higher than the surface recording density of binary recording.

FIG. 10A to FIG. 10C and FIG. 11A to FIG. 11C are graphs of characteristics of the magnetic recording and reproducing device.

Figure 10A:
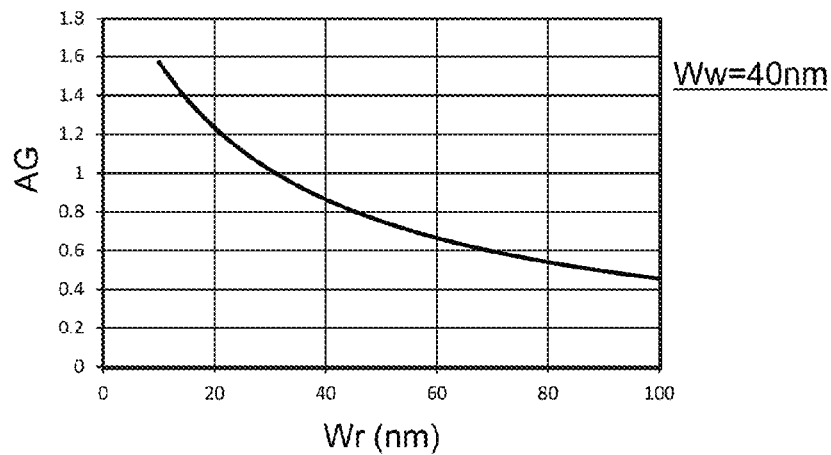
FIG. 10A to FIG. 10C are graphs of characteristics of the magnetic recording and reproducing device.
Figure 10B:
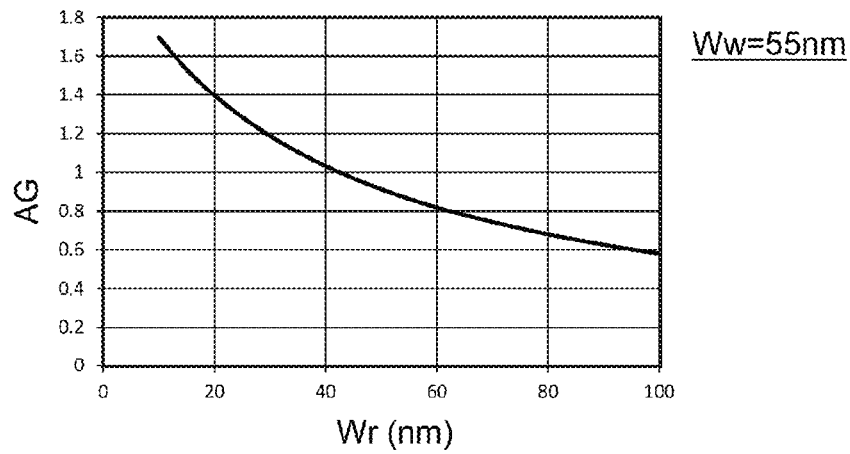
Figure 10C:
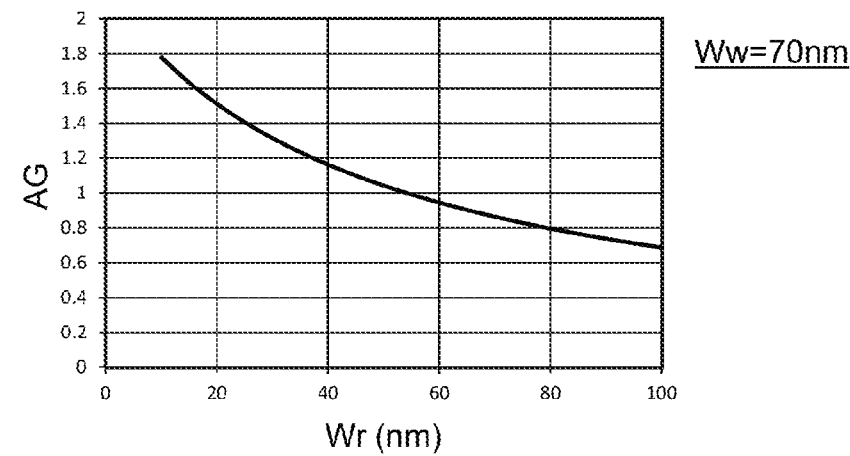

FIG. 10A to FIG. 10C show examples of the change of the recording capacity gain AG when the recording width Ww is fixed and the reproducing width Wr is changed. FIG. 10A to FIG. 10C correspond respectively to the recording width Ww being 40 nm, 55 nm, and 70 nm.

Figure 11A:
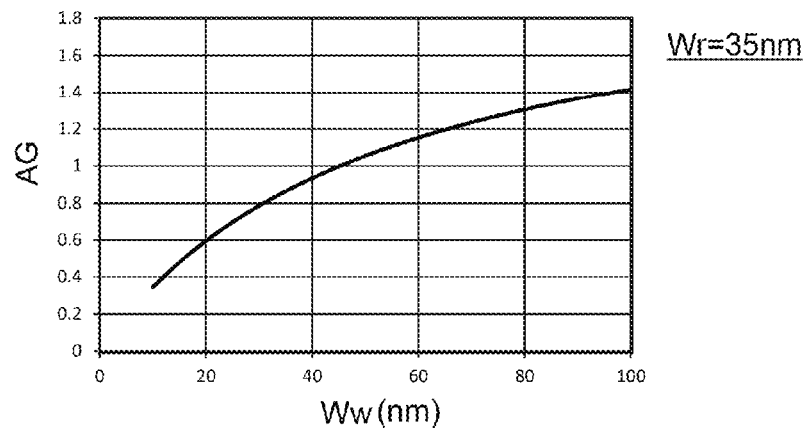
FIG. 11A to FIG. 11C are graphs of characteristics of the magnetic recording and reproducing device.
Figure 11B:
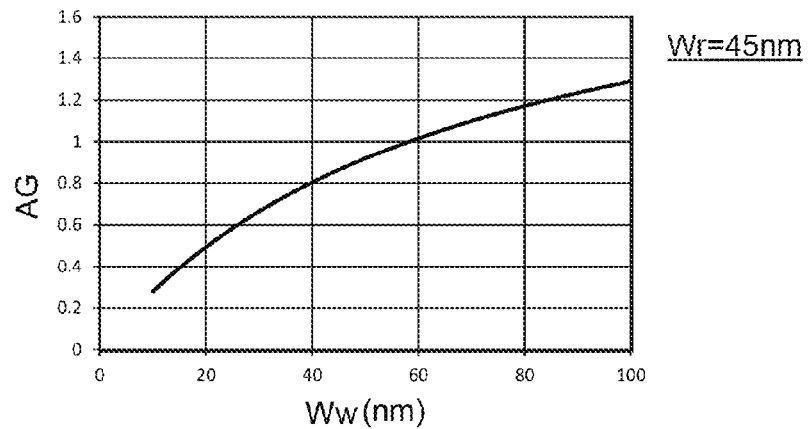
Figure 11C:
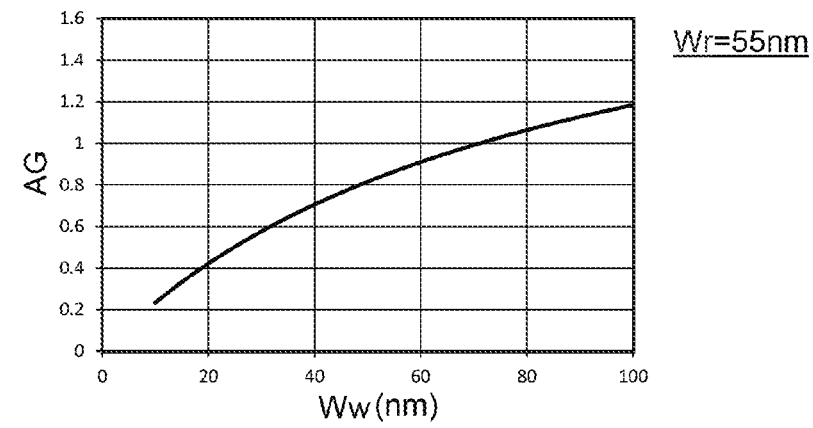

FIG. 11A to FIG. 11C show examples of the change of the recording capacity gain AG when the reproducing width Wr is fixed and the recording width Ww is changed. FIG. 11A to FIG. 11C correspond respectively to the reproducing width Wr being 35 nm, 45 nm, and 55 nm.

As shown in FIG. 10A to FIG. 10C, the recording capacity gain AG increases as the reproducing width Wr decreases.

When the recording width Ww is 40 nm, it is sufficient for the reproducing width Wr to be 30 nm or less. When the recording width Ww is 40 nm, it is desirable for the reproducing width Wr to be 20 nm or less.

When the recording width Ww is 55 nm, it is sufficient for the reproducing width Wr to be 40 nm or less. When the recording width Ww is 55 nm, it is desirable for the reproducing width Wr to be 30 nm or less.

When the recording width Ww is 70 nm, it is sufficient for the reproducing width Wr to be 50 nm or less. When the recording width Ww is 70 nm, it is desirable for the reproducing width Wr to be 40 nm or less.

As shown in FIG. 11A to FIG. 11C, the recording capacity gain AG increases as the recording width Ww decreases.

When the reproducing width Wr is 35 nm, it is sufficient for the recording width Ww to be 45 nm or more. When the reproducing width Wr is 35 nm, it is desirable for the recording width Ww to be 65 nm or more.

When the reproducing width Wr is 45 nm, it is sufficient for the recording width Ww to be 60 nm or more. When the reproducing width Wr is 45 nm, it is desirable for the recording width Ww to be 85 nm or more.

When the reproducing width Wr is 55 nm, it is sufficient for the recording width Ww to be 70 nm or more. When the reproducing width Wr is 55 nm, it is desirable for the recording width Ww to be 100 nm or more.

It is favorable for the reproducing width Wr to be not less than 10 nm and not more than 40 nm, and for the recording width Ww to be not less than 60 nm and not more than 100 nm.

FIG. 12A to FIG. 12D are schematic views illustrating another operation of the magnetic recording and reproducing device according to the first embodiment.

Figure 12A:
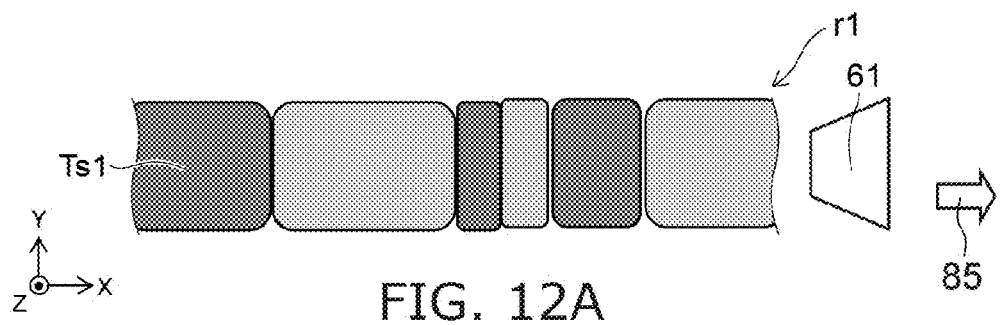
FIG. 12A to FIG. 12D are schematic views illustrating another operation of the magnetic recording and reproducing device according to the first embodiment.

As shown in FIG. 12A, recording is performed in the first region r1 (the region where the first sub-information corresponding to the first sub-track Ts1 is recorded).

Figure 12B:
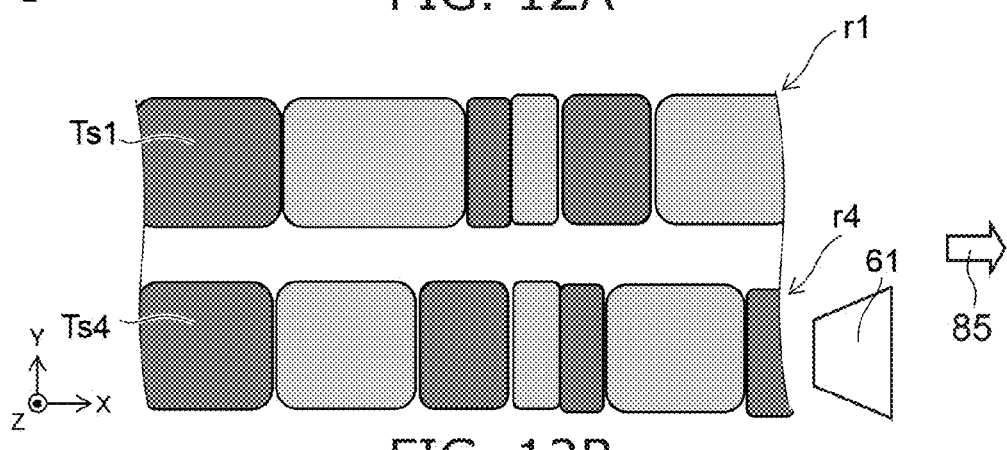

Subsequently, as shown in FIG. 12B, recording is performed in the fourth region r4 (the region where the fourth sub-information corresponding to the fourth sub-track Ts4 is recorded).

Figure 12C:
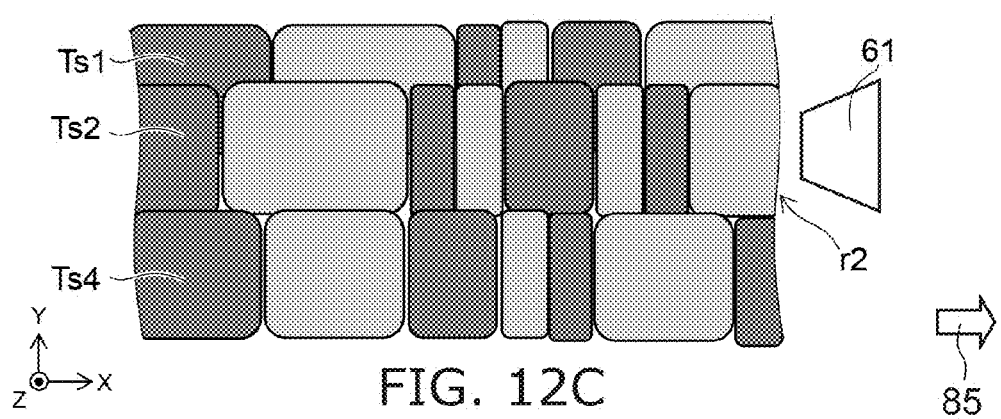

Subsequently, as shown in FIG. 12C, recording is performed in the second region r2 (the region where the second sub-information corresponding to the second sub-track Ts2 is recorded).

Figure 12D:
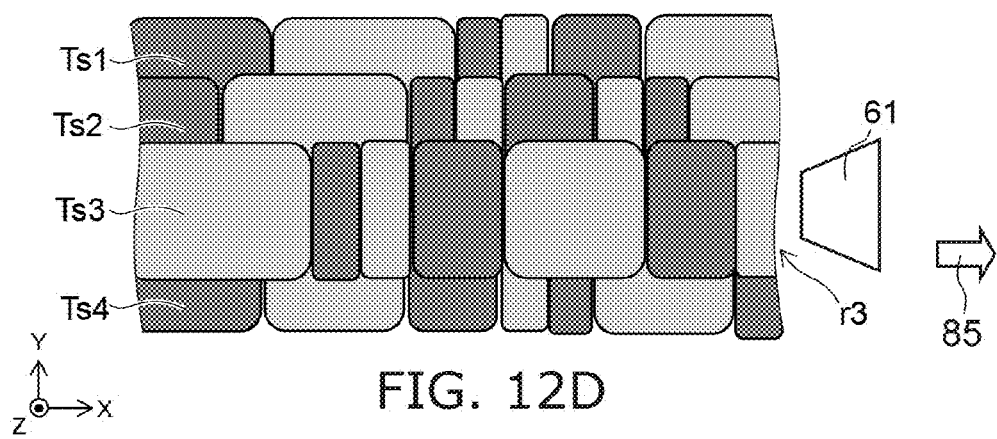

Subsequently, as shown in FIG. 12D, recording is performed in the third region r3 (the region where the third sub-information corresponding to the third sub-track Ts3 is recorded).

The recording pattern illustrated in FIG. 1C is obtained by recording using such a method as well.

Recording using the following method may be performed as another operation of the magnetic recording and reproducing device according to the first embodiment.

First, recording is performed in the fourth region r4 (the region where the fourth sub-information corresponding to the fourth sub-track Ts4 is recorded).

Subsequently, recording is performed in the first region r1 (the region where the first sub-information corresponding to the first sub-track Ts1 is recorded).

Subsequently, recording is performed in the second region r2 (the region where the second sub-information corresponding to the second sub-track Ts2 is recorded).

Subsequently, recording is performed in the third region r3 (the region where the third sub-information corresponding to the third sub-track Ts3 is recorded).

The recording pattern illustrated in FIG. 1C is obtained by recording using such a method as well.

FIG. 13A to FIG. 13D are schematic views illustrating another operation of the magnetic recording and reproducing device according to the first embodiment.

Figure 13A:
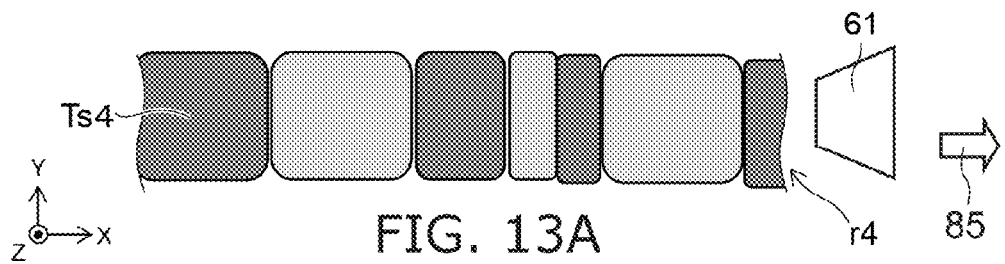
FIG. 13A to FIG. 13D are schematic views illustrating another operation of the magnetic recording and reproducing device according to the first embodiment.

As shown in FIG. 13A, recording is performed in the fourth region r4 (the region where the fourth sub-information corresponding to the fourth sub-track Ts4 is recorded).

Figure 13B:
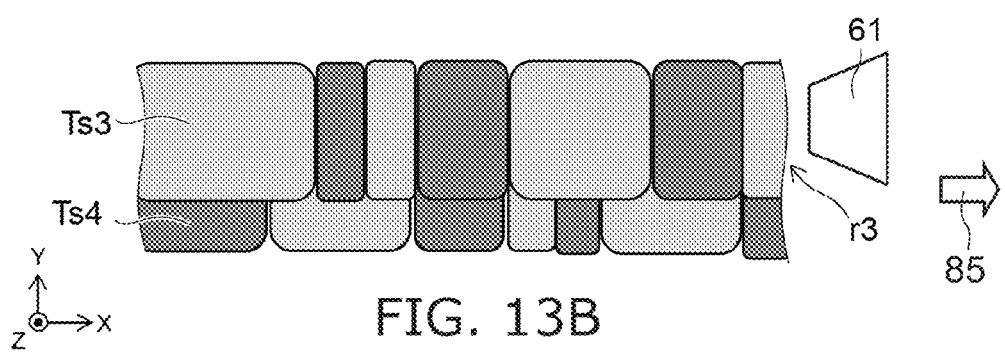

Subsequently, as shown in FIG. 13B, recording is performed in the third region r3 (the region where the third sub-information corresponding to the third sub-track Ts3 is recorded).

Figure 13C:
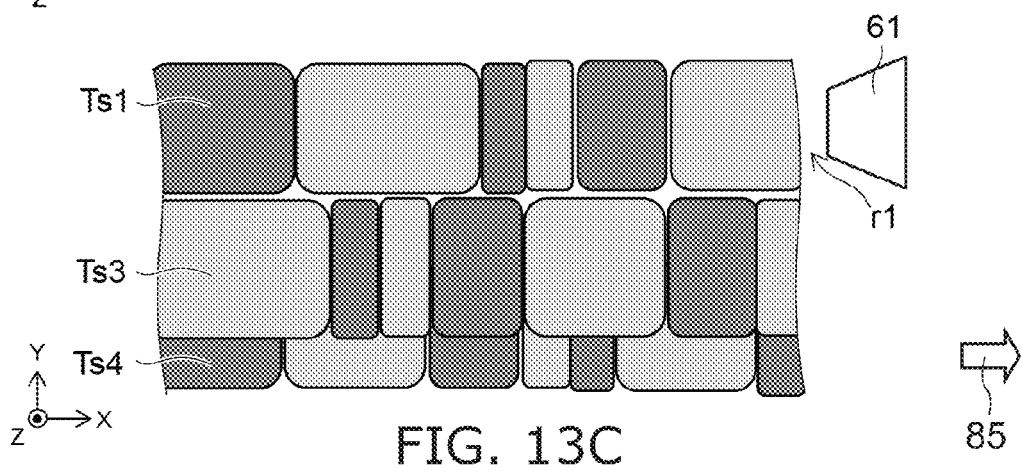

Subsequently, as shown in FIG. 13C, recording is performed in the first region r1 (the region where the first sub-information corresponding to the first sub-track Ts1 is recorded).

Figure 13D:
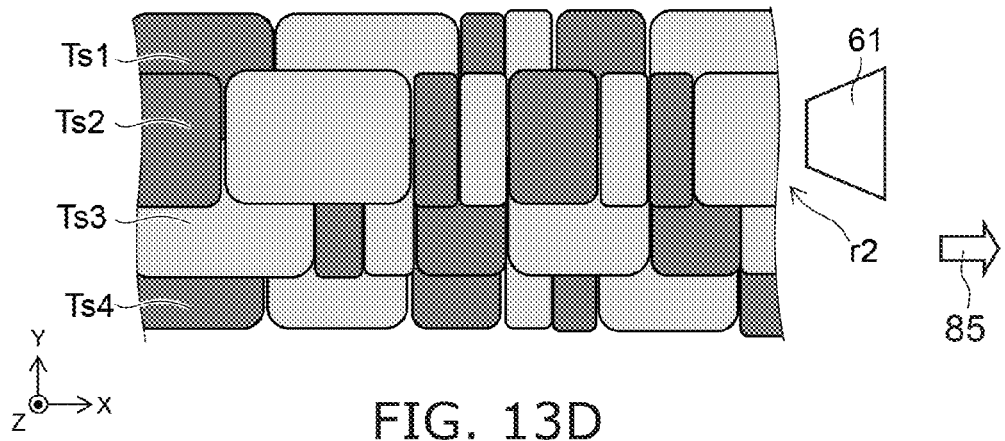

Subsequently, as shown in FIG. 13D, recording is performed in the second region r2 (the region where the second sub-information corresponding to the second sub-track Ts2 is recorded).

The recording pattern by recording using such a method is the reverse of the recording pattern illustrated in FIG. 1C around the X-axis direction as an axis. In such a case as well, a high recording density is obtained. Also, random overwriting is possible.

FIG. 14A to FIG. 14D are schematic views illustrating the magnetic recording and reproducing device according to the first embodiment.

Figure 14A:
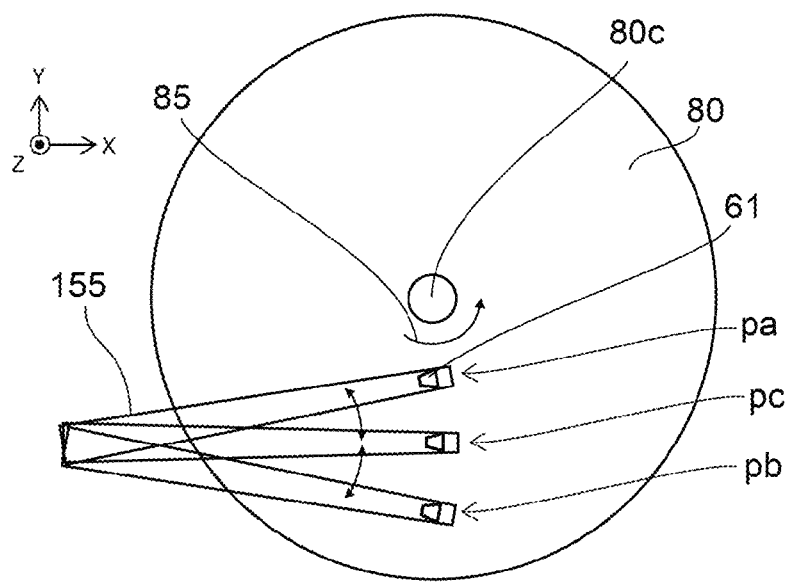
FIG. 14A to FIG. 14D are schematic views illustrating the magnetic recording and reproducing device according to the first embodiment.
Figure 14B:
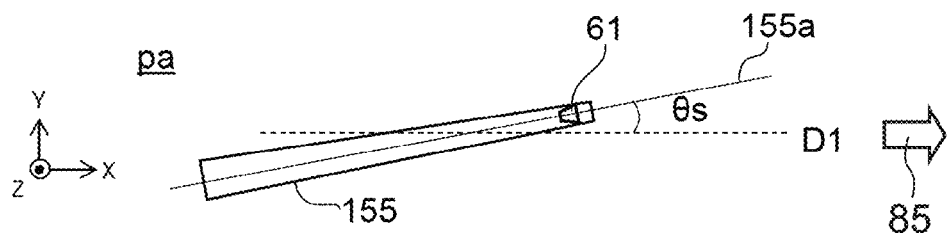
Figure 14C:
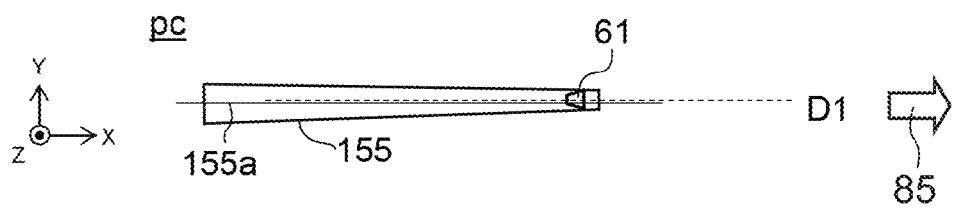
Figure 14D:
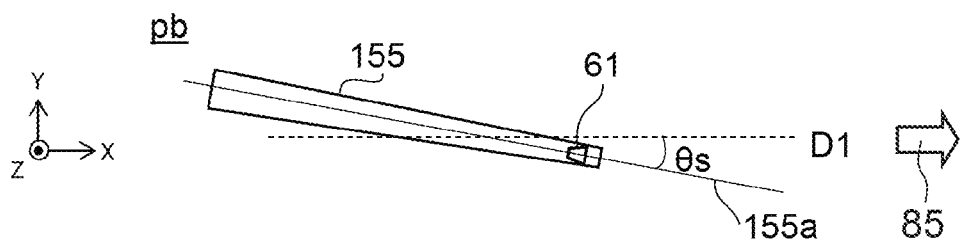

FIG. 14B to FIG. 14D illustrate an enlarged portion of the region shown in FIG. 14A.

As shown in FIG. 14A, the planar configuration of the magnetic recording medium 80 is, for example, a circle. On the other hand, an arm 155 that has a movable tip portion is provided. The magnetic head 50 (i.e., the magnetic pole 61) is provided at the tip portion of the arm 155. The magnetic pole 61 moves relative to the magnetic recording medium 80 by rotating the arm 155 using a prescribed support as an axis.

For example, the magnetic recording medium 80 has a disk configuration having a center 80c. The magnetic recording medium 80 includes an inner region pa, an outer region pb, and a middle region pc. The inner region pa is provided between the outer region pb and the center 80c. The middle region pc is provided between the outer region pb and the inner region pa. The magnetic recording medium 80 is rotated using the center 80c as an axis.

The angle between the extension direction of the arm 155 and the extension direction of the track is different between the inner region pa, the outer region pb, and the middle region pc.

As shown in FIG. 14C, for example, in the middle region pc, the angle between a first direction D1 and an extension direction 155a of the arm 155 is small. The first direction D1 corresponds to the medium movement direction 85. In other words, the extension direction 155a is substantially parallel to the medium movement direction 85.

As shown in FIG. 14B, for example, in the inner region pa, the absolute value of the angle (a skew angle θs) between the first direction D1 (the medium movement direction 85) and the extension direction 155a of the arm 155 is large. The skew angle θs is, for example, positive.

As shown in FIG. 14D, for example, in the outer region pb, the absolute value of the angle (the skew angle θs) between the first direction D1 (the medium movement direction 85) and the extension direction 155a of the arm 155 is large. The skew angle θs is, for example, negative.

In the embodiment, the order (the direction) of the recording to the two sub-tracks is reversed between the first track Tr1 and the second track Tr2. When the absolute value of the skew angle θs is large, the information (the state of the magnetization) to be recorded changes according to the order (the direction) of the recording. Therefore, it is favorable for the absolute value of the skew angle θs to be small when implementing the recording method according to the embodiment. For example, the recording method according to the embodiment recited above may be implemented when the absolute value of the skew angle θs is 4 degrees or less. Thereby, a high recording density is obtained.

For example, the recording method according to the embodiment recited above is implemented in the middle region pc. On the other hand, the recording method according to the embodiment recited above may not be implemented for at least portions of the inner region pa and the outer region pb. For example, binary recording may be implemented in these regions. Or, the recording methods described in regard to the magnetic recording and reproducing devices 159a and 159b may be implemented in these regions.

Figure 15A:
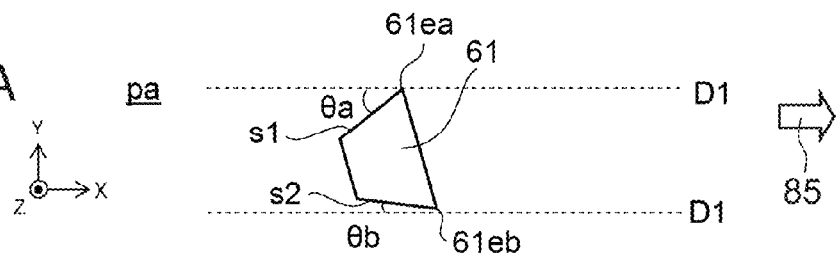
FIG. 15A to FIG. 15C are schematic views illustrating the magnetic recording and reproducing device according to the first embodiment.
Figure 15B:
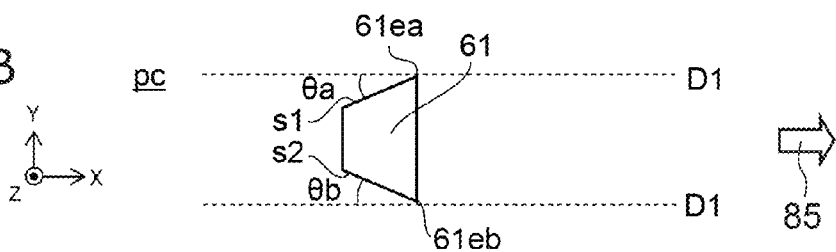
Figure 15C:
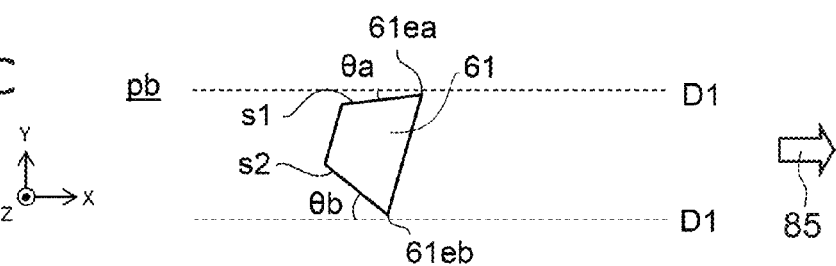

FIG. 15A to FIG. 15C are schematic views illustrating the magnetic recording and reproducing device according to the first embodiment.

These drawings illustrate the state of the magnetic pole 61 in the inner region pa, the outer region pb, and the middle region pc.

As shown in FIG. 15B, the magnetic pole 61 (the recording unit 60) has a first bevel angle θa and a second bevel angle θb. The first bevel angle θa is the angle between the first direction D1 and a first side surface s1 including the first magnetic pole end portion 61ea of the magnetic pole 61. The second bevel angle θb is the angle between the first direction D1 and a second side surface s2 including the second magnetic pole end portion 61eb of the magnetic pole 61. In the middle region pc, the difference between the absolute value of the first bevel angle θa and the absolute value of the second bevel angle θb is small. The absolute value of the first bevel angle θa is, for example, substantially the same as the absolute value of the second bevel angle θb.

In the inner region pa as shown in FIG. 15A, the absolute value of the first bevel angle θa is greater than the absolute value of the second bevel angle θb.

In the outer region pb as shown in FIG. 15C, the absolute value of the first bevel angle θa is less than the absolute value of the second bevel angle θb.

In the embodiment, the order (the direction) of the recording to the two sub-tracks is reversed between the first track Tr1 and the second track Tr2. Therefore, the information (the state of the magnetization) to be recorded changes according to the order (the direction) of the recording when the difference between the absolute value of the first bevel angle θa and the absolute value of the second bevel angle θb is large. Therefore, it is favorable for the difference between the absolute value of the first bevel angle θa and the absolute value of the second bevel angle θb to be small when implementing the recording method according to the embodiment. For example, the recording method according to the embodiment recited above may be implemented when the difference between the absolute value of the first bevel angle θa and the absolute value of the second bevel angle θb is 4 degrees or less. Thereby, a high recording density is obtained.

Figure 16:
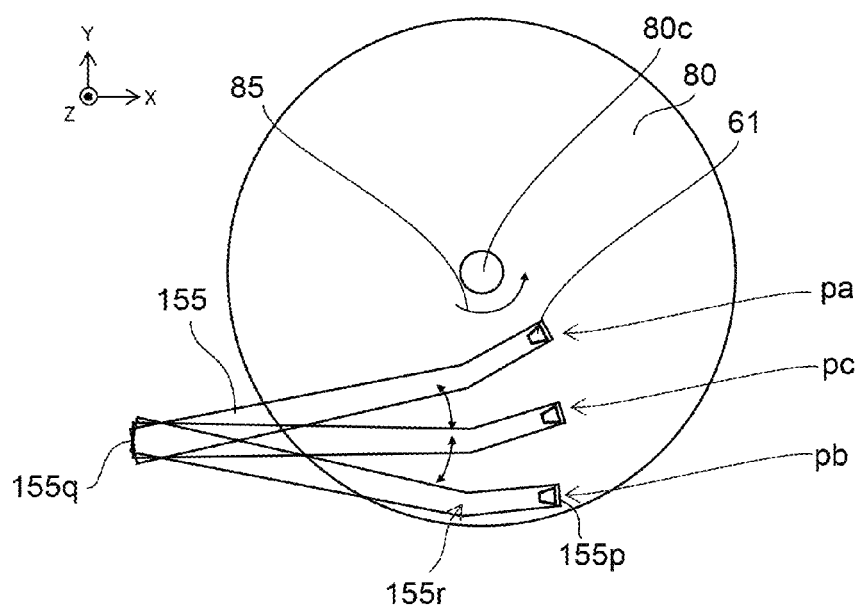
FIG. 16 is a schematic plan view illustrating another magnetic recording and reproducing device according to the first embodiment.

FIG. 16 is a schematic plan view illustrating another magnetic recording and reproducing device according to the first embodiment.

In the example shown in FIG. 16, the extension direction of the arm 155 changes partway through the arm 155. In other words, the arm 155 includes one end portion 155p, one other end portion 155q, and a middle portion 155r between the one end portion 155p and the one other end portion 155q. The recording unit 60 and the reproducing unit 70 are mounted to the one end portion 155p. The direction from the one other end portion 155q toward the middle portion 155r intersects the direction from the middle portion 155r toward the one end portion 155p. In other words, the one end portion 155p, the middle portion 155r, and the one other end portion 155q are not arranged on a straight line.

In other words, the extension direction of the arm 155 bends from partway through the arm 155 toward the center 80c of the magnetic recording medium 80. The one end portion 155p is positioned between the center 80c of the magnetic recording medium 80 and an extension line of the direction connecting the one other end portion 155q and the middle portion 155r. The angle between the straight line connecting the one other end portion 155q and the center 80c of the magnetic recording medium 80 and the straight line connecting the one other end portion 155q and the one end portion 155p is smaller than the angle between the straight line connecting the one other end portion 155q and the center 80c of the magnetic recording medium 80 and the straight line connecting the one other end portion 155q and the middle portion 155r.

Thereby, the absolute value of the skew angle θs in the inner region pa and the outer region pb can be reduced. For example, the absolute value of the skew angle θs can be set to be 4 degrees or less over the entire region of the inner region pa, the middle region pc, and the outer region pb. The recording method according to the embodiment recited above may be implemented not only in the middle region pc but also in the inner region pa and the outer region pb. Thereby, a high recording density is obtained. Thus, the arm 155 may have a structure having a small skew angle.

Figure 17:
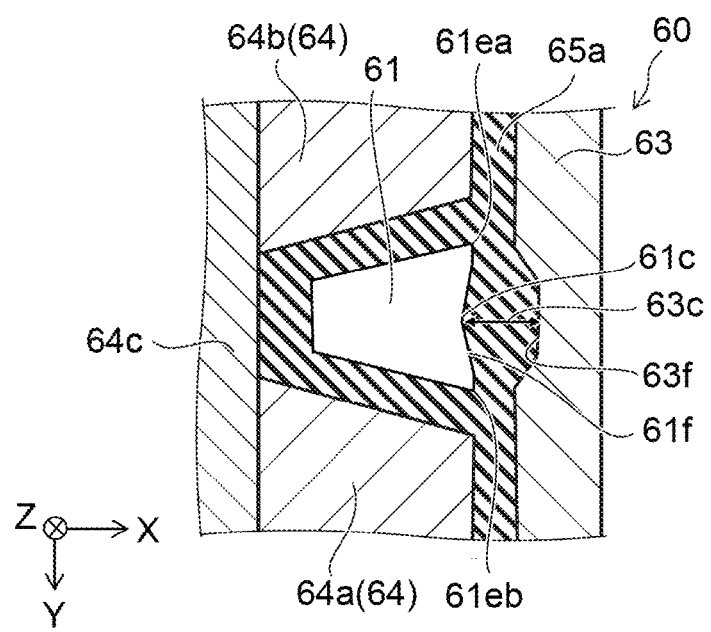
FIG. 17 is a schematic plan view illustrating another magnetic recording and reproducing device according to the first embodiment.

FIG. 17 is a schematic plan view illustrating another magnetic recording and reproducing device according to the first embodiment.

In the recording unit 60 in the example shown in FIG. 17, the distance between the magnetic pole 61 and the write shield 63 changes along the Y-axis direction. In other words, the magnetic pole 61 includes a magnetic pole central portion 61c. The magnetic pole central portion 61c is provided between the first magnetic pole end portion 61ea (the end on the first side shield 64a side) and the second magnetic pole end portion 61eb (the end on the second side shield 64b side) in the Y-axis direction.

The magnetic pole 61 has a surface (a magnetic pole surface 61f) opposing the write shield 63. In the example, the magnetic pole surface 61f recedes at the magnetic pole central portion 61c. On the other hand, the write shield 63 has a surface (a write shield surface 63f) opposing the magnetic pole 61. The write shield surface 63f includes a portion (a write shield central portion 63c) opposing the magnetic pole central portion 61c. The write shield central portion 63c recedes.

The distance (the distance along the X-axis direction) between the magnetic pole central portion 61c and the write shield 63 is longer than the distance (the distance along the X-axis direction) between the first magnetic pole end portion 61ea and the write shield 63 and longer than the distance (the distance along the X-axis direction) between the second magnetic pole end portion 61eb and the write shield 63. The write gap WG changes in the Y-axis direction. The write gap WG at the position of the magnetic pole central portion 61c is wider than the write gap WG at the first magnetic pole end portion 61ea and wider than the write gap WG at the second magnetic pole end portion 61eb. Thereby, the linear recording density BPI at the ends (the first magnetic pole end portion 61ea and the second magnetic pole end portion 61eb) of the magnetic pole 61 can be increased. Thereby, a higher recording density is obtained.

Second Embodiment

In the embodiment, various recording methods described in the first embodiment are implemented in combination. The configuration of the magnetic recording and reproducing device according to the embodiment is similar to the configuration described in the first embodiment, and a description is therefore omitted. Examples of operations of the magnetic recording and reproducing device according to the embodiment will now be described.

Figure 18A:
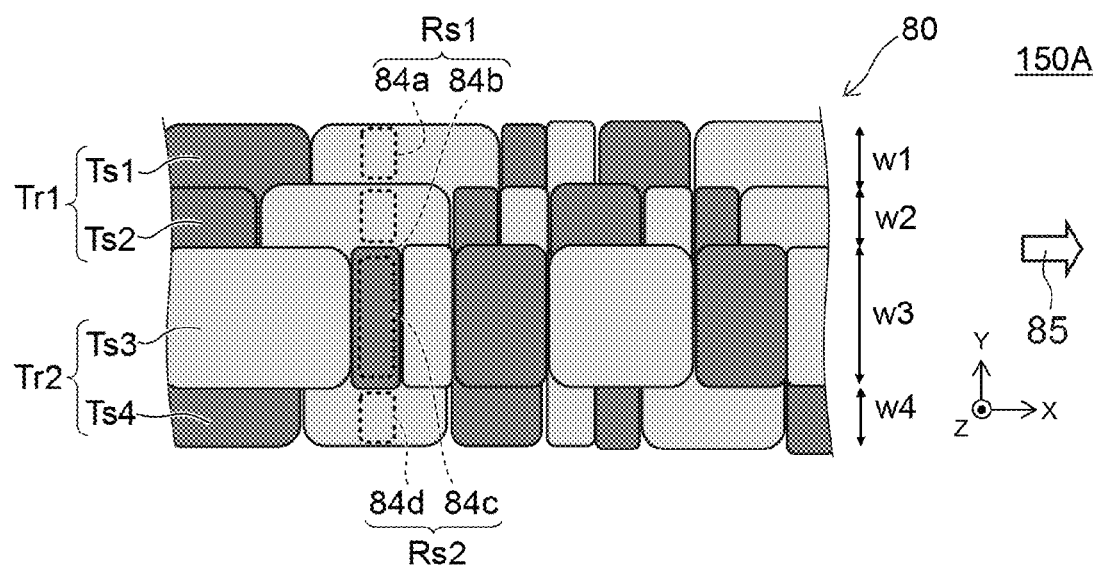
FIGS. 18A and 18B are schematic plan views illustrating the magnetic recording and reproducing device according to the second embodiment.
Figure 18B:
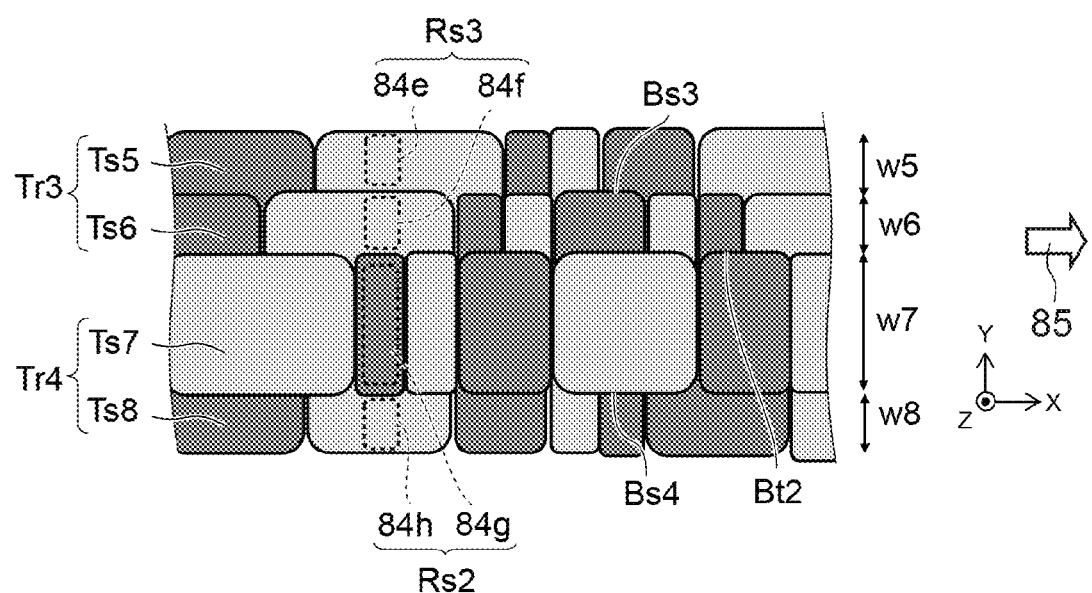

FIGS. 18A and 18B are schematic plan views illustrating the magnetic recording and reproducing device according to the second embodiment.

FIGS. 18A and 18B are plan views illustrating the magnetic recording medium 80 of the magnetic recording and reproducing device 150A according to the embodiment.

As shown in FIGS. 18A and 18B, in addition to the first track Tr1 and the second track Tr2, the magnetic recording medium 80 includes a third track Tr3 that extends in the first direction (e.g., the X-axis direction), and a fourth track Tr4 that extends in the first direction. The fourth track Tr4 is arranged with the third track Tr3 in the second direction (e.g., the Y-axis direction).

The third track Tr3 includes a fifth sub-track Ts5 that extends in the first direction, and a sixth sub-track Ts6 that extends in the first direction. The fourth track Tr4 includes a seventh sub-track Ts7 that extends in the first direction, and an eighth sub-track Ts8 that extends in the first direction. The sixth sub-track Ts6 is disposed between the fifth sub-track Ts5 and the eighth sub-track Ts8. The seventh sub-track Ts7 is disposed between the sixth sub-track Ts6 and the eighth sub-track Ts8.

In the example, the third track Tr3 is disposed between the second track Tr2 and the fourth track Tr4. In the embodiment, the fourth track Tr4 may be disposed between the second track Tr2 and the third track Tr3. In the embodiment, the fourth track Tr4 may be disposed between the first track Tr1 and the third track Tr3. In the embodiment, the third track Tr3 may be disposed between the first track Tr1 and the fourth track Tr4.

The recording unit 60 further records information in the third track Tr3 and the fourth track Tr4. The reproducing unit 70 reproduces third information recorded in the third track Tr3 while opposing the fifth sub-track Ts5, the sixth sub-track Ts6, and a third boundary Bs3 between the fifth sub-track Ts5 and the sixth sub-track Ts6.

The reproducing unit 70 reproduces fourth information recorded in the fourth track Tr4 while opposing the seventh sub-track Ts7, the eighth sub-track Ts8, and a fourth boundary Bs4 between the seventh sub-track Ts7 and the eighth sub-track Ts8.

In the example, a boundary Bt2 between the third track Tr3 and the fourth track Tr4 corresponds to the boundary between the sixth sub-track Ts6 and the seventh sub-track Ts7.

In the example, a seventh sub-track width w7 along the second direction (the Y-axis direction) of the seventh sub-track Ts7 is wider than a fifth sub-track width w5 along the second direction of the fifth sub-track Ts5. The seventh sub-track width w7 is wider than a sixth sub-track width w6 along the second direction of the sixth sub-track Ts6. The seventh sub-track width w7 is wider than an eighth sub-track width w8 along the second direction of the eighth sub-track Ts8.

Ternary recording is performed in the third track Tr3 and the fourth track Tr4 as well.

In other words, the fifth sub-track Ts5 includes a fifth recording component 84e. The sixth sub-track Ts6 includes a sixth recording component 84f arranged with the fifth recording component 84e in the second direction. A third recording symbol Rs3 is formed of the fifth recording component 84e and the sixth recording component 84f.

The seventh sub-track Ts7 includes a seventh recording component 84g. The eighth sub-track Ts8 includes an eighth recording component 84h arranged with the seventh recording component 84g in the second direction. A fourth recording symbol Rs4 is formed of the seventh recording component 84g and the eighth recording component 84h.

FIG. 19A to FIG. 19H are schematic views illustrating states of the magnetic recording medium included in the magnetic recording and reproducing device according to the second embodiment.

Figures 19A, 19B, 19C, 19D:
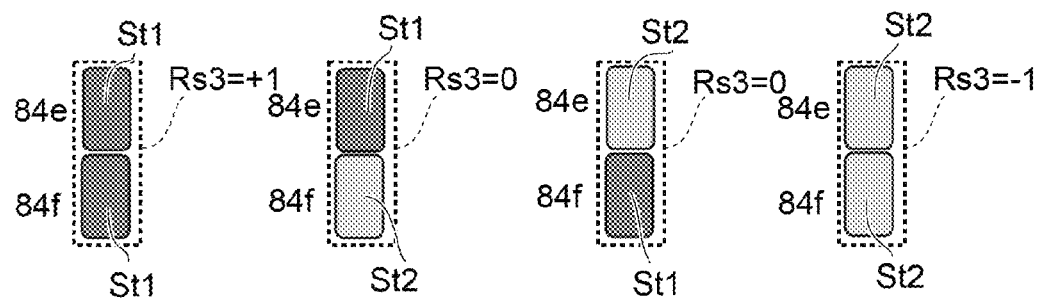
FIG. 19A to FIG. 19H are schematic views illustrating states of the magnetic recording medium included in the magnetic recording and reproducing device according to the second embodiment.

As shown in FIG. 19A, the third recording symbol Rs3 has the first value ("+1") when the magnetization of the fifth recording component 84e is in the first state St1 and the magnetization of the sixth recording component 84f is in the first state St1.

As shown in FIG. 19D, the third recording symbol Rs3 has the second value ("−1") when the magnetization of the fifth recording component 84e is in the second state St2 and the magnetization of the sixth recording component 84f is in the second state St2.

As shown in FIG. 19B, the third recording symbol Rs3 has the third value ("0") when the magnetization of the fifth recording component 84e is in the first state St1 and the magnetization of the sixth recording component 84f is in the second state St2.

As shown in FIG. 19C, the third recording symbol Rs3 has the third value ("0") when the magnetization of the fifth recording component 84e is in the second state St2 and the magnetization of the sixth recording component 84f is in the first state St1.

Figures 19E, 19F, 19G, 19H:
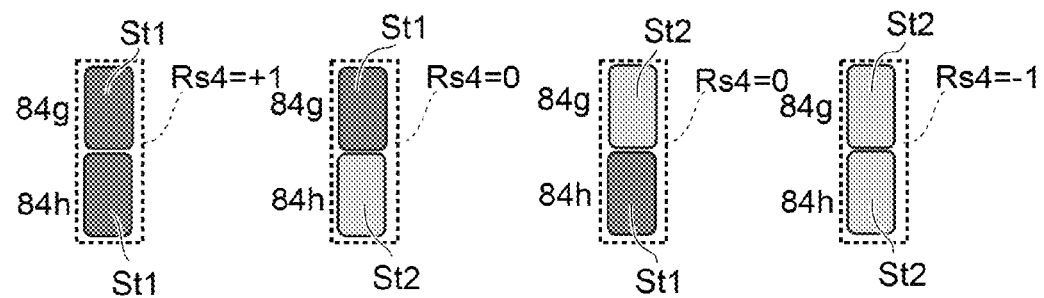

As shown in FIG. 19E, the fourth recording symbol Rs4 has the first value ("+1") when the magnetization of the seventh recording component 84g is in the first state St1 and the magnetization of the eighth recording component 84h is in the first state St1.

As shown in FIG. 19H, the fourth recording symbol Rs4 has the second value ("−1") when the magnetization of the seventh recording component 84g is in the second state St2 and the magnetization of the eighth recording component 84h is in the second state St2.

As shown in FIG. 19F, the fourth recording symbol Rs4 has the third value ("0") when the magnetization of the seventh recording component 84g is in the first state St1 and the magnetization of the eighth recording component 84h is in the second state St2.

As shown in FIG. 19G, the fourth recording symbol Rs4 has the third value ("0") when the magnetization of the seventh recording component 84g is in the second state St2 and the magnetization of the eighth recording component 84h is in the first state St1.

In the example, the seventh sub-track width w7 is wider than a fifth sub-track width w5, wider than the sixth sub-track width w6, and wider than the eighth sub-track width w8. In other words, the recording method described in the first embodiment is employed for the third track Tr3 and the fourth track Tr4. A high recording density is obtained for the third track Tr3 and the fourth track Tr4 of the magnetic recording and reproducing device 150A as well. Also, random overwriting is possible.

In the magnetic recording and reproducing device 150A, for example, the set of the third track Tr3 and the fourth track Tr4 may be arranged with the set of the first track Tr1 and the second track Tr2 as an extension of the medium movement direction 85 having the substantially circumferential configuration.

Figure 20A:
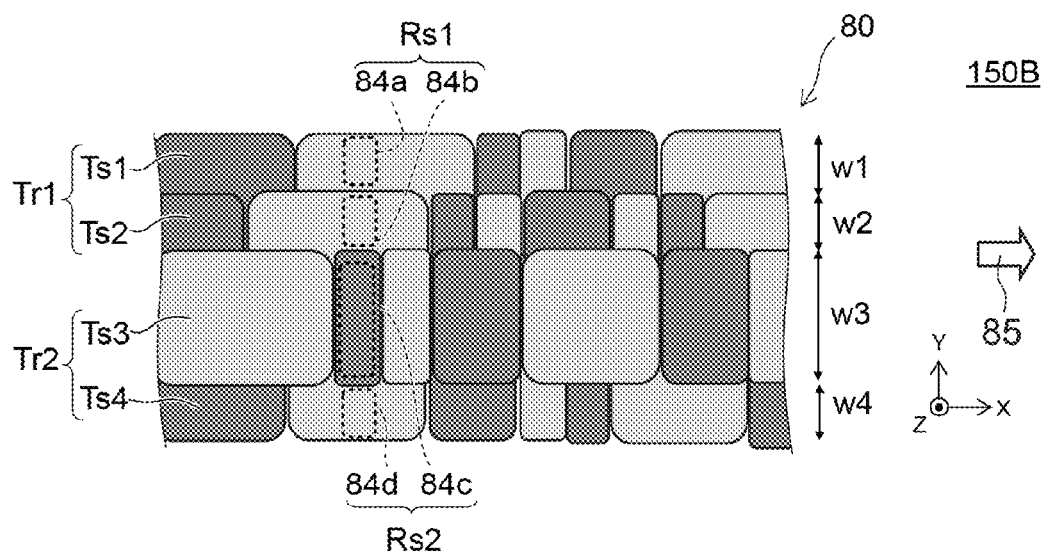
FIGS. 20A and 20B are schematic plan views illustrating the magnetic recording and reproducing device according to the second embodiment.
Figure 20B:
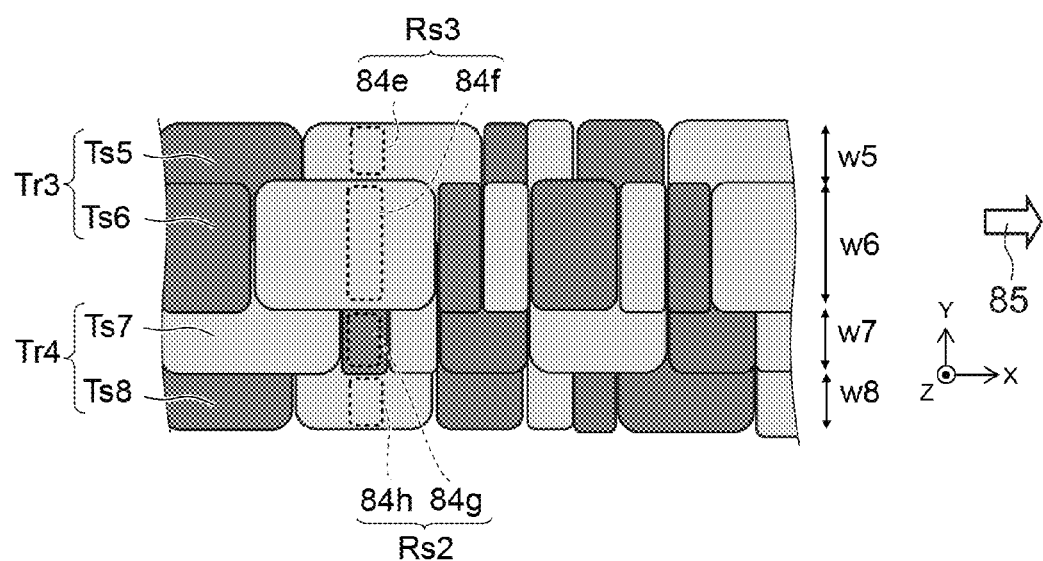

FIGS. 20A and 20B are schematic plan views illustrating the magnetic recording and reproducing device according to the second embodiment.

FIGS. 20A and 20B are plan views illustrating the magnetic recording medium 80 of a magnetic recording and reproducing device 150B according to the embodiment.

In the magnetic recording and reproducing device 150B, the sixth sub-track width w6 is wider than the fifth sub-track width w5, wider than the seventh sub-track width w7, and wider than the eighth sub-track width w8. Otherwise, the magnetic recording and reproducing device 150B is similar to the magnetic recording and reproducing device 150A. A high recording density is obtained in the magnetic recording and reproducing device 150B as well. Also, random overwriting is possible.

Figure 21A:
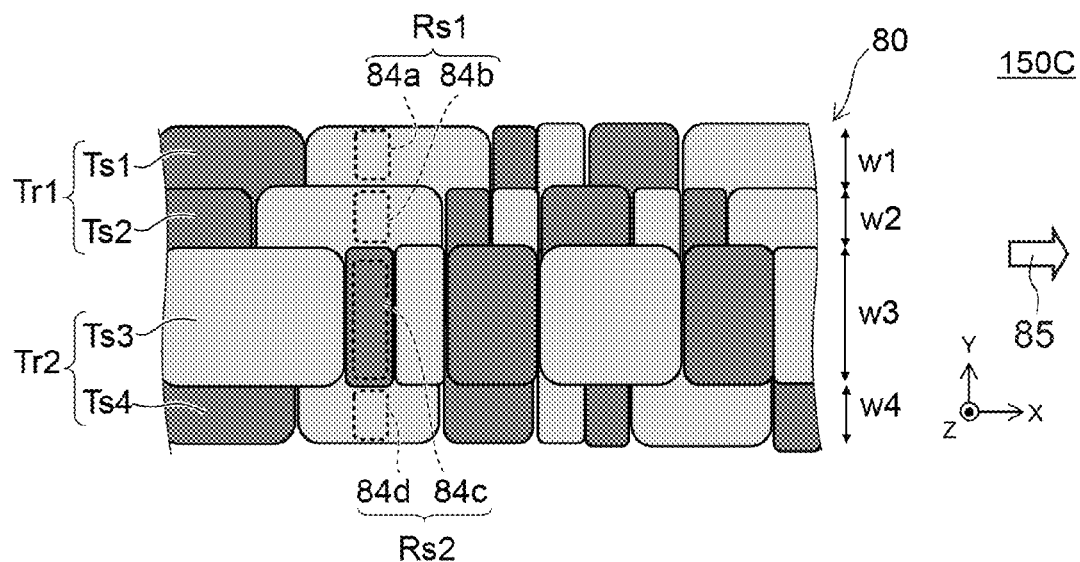
FIGS. 21A and 21B are schematic plan views illustrating the magnetic recording and reproducing device according to the second embodiment.
Figure 21B:
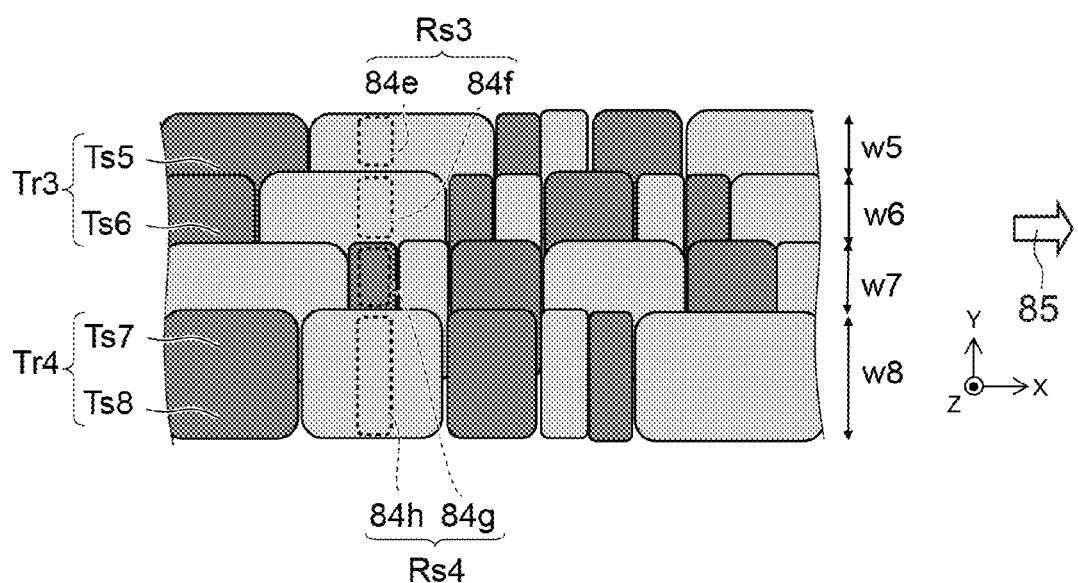

FIGS. 21A and 21B are schematic plan views illustrating the magnetic recording and reproducing device according to the second embodiment.

FIGS. 21A and 21B are plan views illustrating the magnetic recording medium 80 of a magnetic recording and reproducing device 150C according to the embodiment.

The recording method described in regard to the magnetic recording and reproducing device 159b is performed for the third track Tr3 and the fourth track Tr4 of the magnetic recording and reproducing device 150C.

Namely, the eighth sub-track width w8 along the second direction (e.g., the Y-axis direction) of the eighth sub-track Ts8 is wider than the fifth sub-track width w5 along the second direction of the fifth sub-track Ts5. The eighth sub-track width w8 is wider than the sixth sub-track width w6 along the second direction of the sixth sub-track Ts6. The eighth sub-track width w8 is wider than the seventh sub-track width w7 along the second direction of the seventh sub-track Ts7. A high recording density is obtained in the magnetic recording and reproducing device 150C as well. For example, there are cases where a high recording density is obtained for the recording in one order (direction) in a designated region inside the magnetic recording medium 80 (e.g., in the inner region pa, the outer region pb, etc.). In such a case, the recording of the first track Tr1 and the second track Tr2 illustrated in FIG. 21A is performed in the middle region pc; and the recording of the third track Tr3 and the fourth track Tr4 illustrated in FIG. 21B may be performed in at least one of the inner region pa or the outer region pb. A region is provided where a high recording density and random overwriting are obtained; and a region is provided where a high recording density is obtained. The magnetic recording medium 80 can be utilized effectively; and a high recording density is obtained for the magnetic recording medium 80 as an entirety.

Figure 22A:
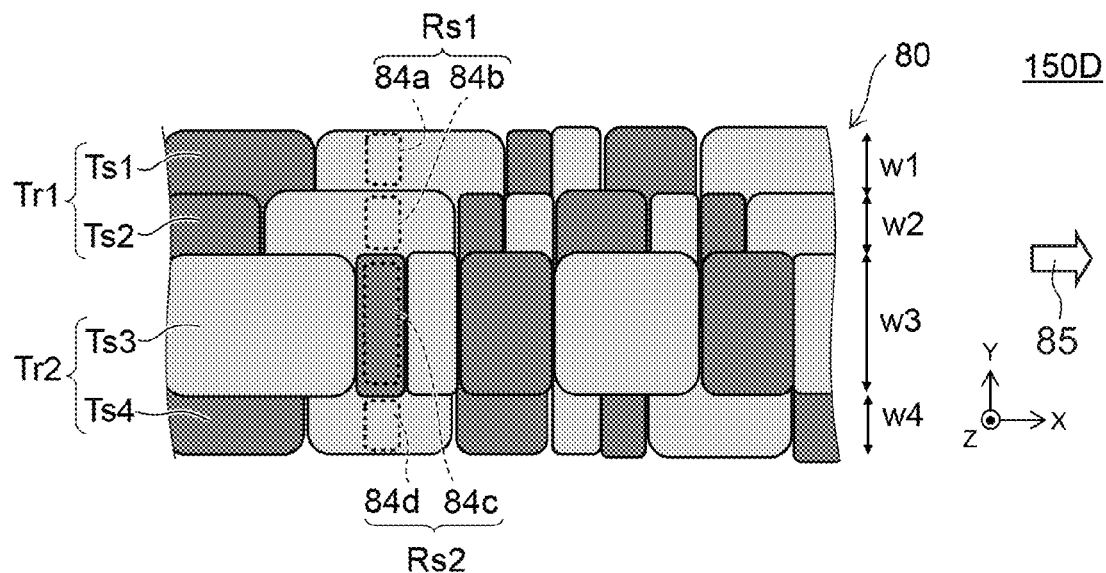
FIGS. 22A and 22B are schematic plan views illustrating the magnetic recording and reproducing device according to the second embodiment.
Figure 22B:
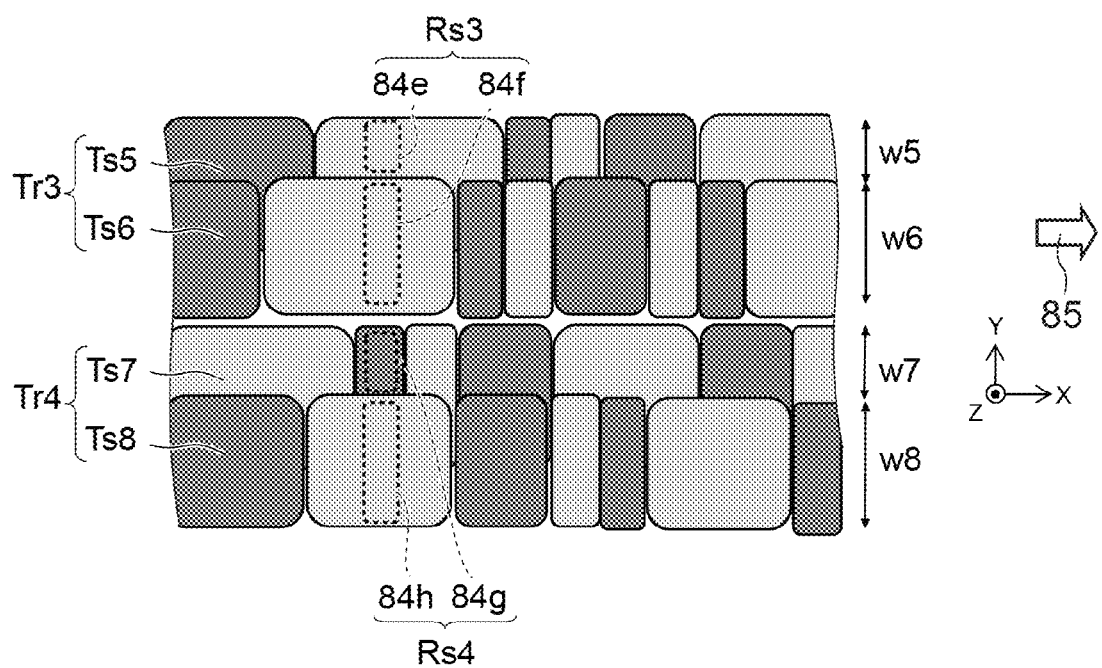

FIGS. 22A and 22B are schematic plan views illustrating the magnetic recording and reproducing device according to the second embodiment.

FIGS. 22A and 22B are plan views illustrating the magnetic recording medium 80 of a magnetic recording and reproducing device 150D according to the embodiment.

The recording method described in regard to the magnetic recording and reproducing device 159a is performed for the third track Tr3 and the fourth track Tr4 of the magnetic recording and reproducing device 150D.

Namely, the sixth sub-track width w6 along the second direction (the Y-axis direction) of the sixth sub-track Ts6 is wider than the fifth sub-track width w5 along the second direction of the fifth sub-track Ts5. The eighth sub-track width w8 along the second direction of the eighth sub-track Ts8 is wider than the seventh sub-track width w7 along the second direction of the seventh sub-track Ts7.

For example, the recording of the first track Tr1 and the second track Tr2 illustrated in FIG. 22A may be performed in the middle region pc; and the recording of the third track Tr3 and the fourth track Tr4 illustrated in FIG. 22B may be performed in at least one of the inner region pa or the outer region pb. A region is provided where a high recording density and random overwriting are obtained; and a region is provided where a high recording density is obtained. The magnetic recording medium 80 can be utilized effectively; and a high recording density is obtained for the magnetic recording medium 80 as an entirety.

Figure 23A:
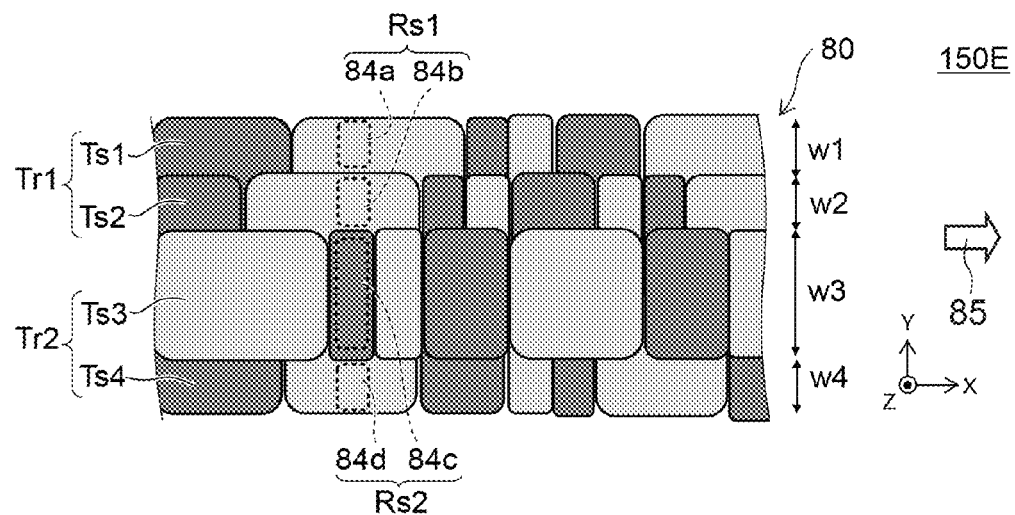
FIGS. 23A and 23B are schematic plan views illustrating the magnetic recording and reproducing device according to the second embodiment.
Figure 23B:
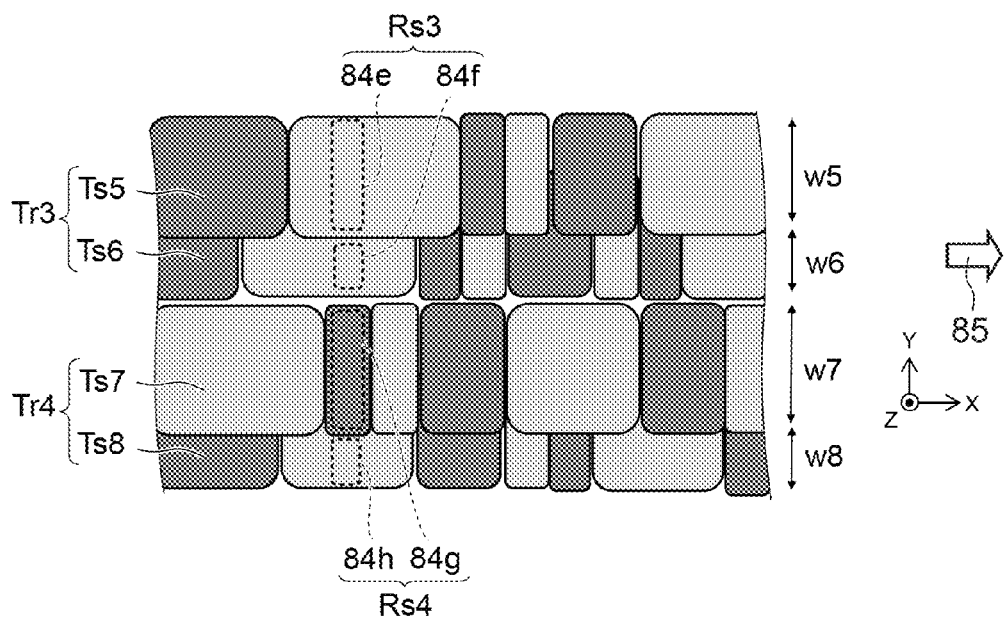

FIGS. 23A and 23B are schematic plan views illustrating the magnetic recording and reproducing device according to the second embodiment.

FIGS. 23A and 23B are plan views illustrating the magnetic recording medium 80 of a magnetic recording and reproducing device 150E according to the embodiment.

The recording method described in regard to the magnetic recording and reproducing device 159a is performed for the third track Tr3 and the fourth track Tr4 of the magnetic recording and reproducing device 150E as well.

In the example, the fifth sub-track width w5 is wider than the sixth sub-track width w6. The seventh sub-track width w7 is wider than the eighth sub-track width w8. Thus, various modifications are possible for the disposition of the sub-track having the large width of the third track Tr3 and the fourth track Tr4 when the set of the first track Tr1 and the second track Tr2 are used as the reference.

Figure 24A:
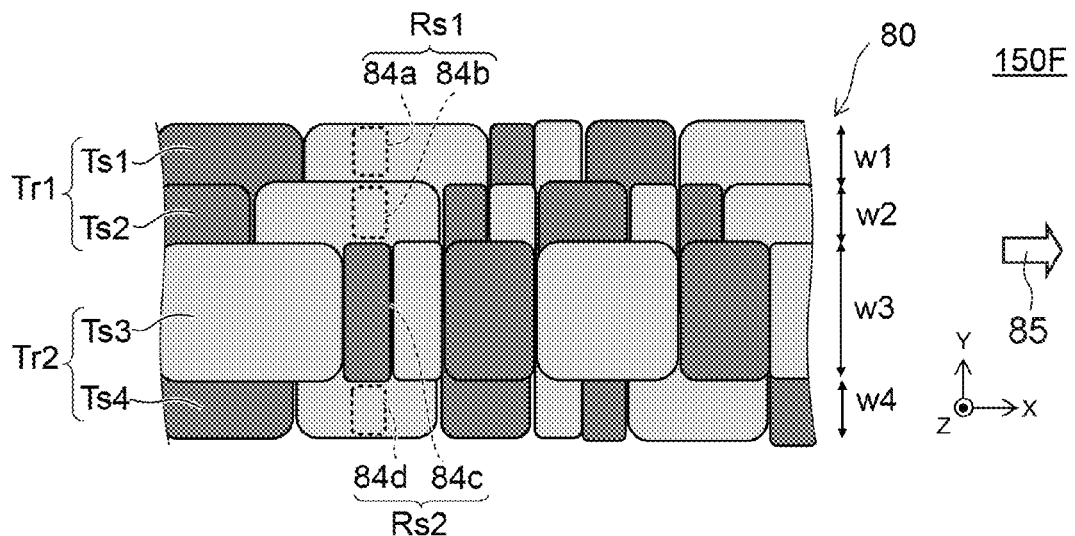
FIGS. 24A and 24B are schematic plan views illustrating the magnetic recording and reproducing device according to the second embodiment.
Figure 24B:
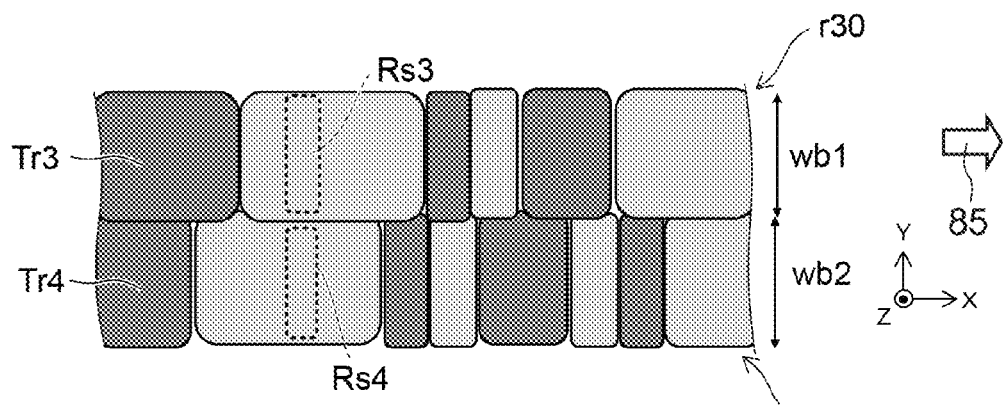

FIGS. 24A and 24B are schematic plan views illustrating the magnetic recording and reproducing device according to the second embodiment.

FIGS. 24A and 24B are plan views illustrating the magnetic recording medium 80 of a magnetic recording and reproducing device 150F according to the embodiment.

Sub-tracks are not provided in the third track Tr3 and the fourth track Tr4 of the magnetic recording and reproducing device 150F. Binary recording is performed for these tracks.

In other words, in addition to the first track Tr1 and the second track Tr2, the magnetic recording medium 80 further includes the third track Tr3 that extends in the first direction (e.g., the X-axis direction), and the fourth track Tr4 that extends in the first direction. The fourth track Tr4 is arranged with the third track Tr3 in the second direction (e.g., the Y-axis direction).

The recording unit 60 records binary information in the third track Tr3 and in the fourth track Tr4. The reproducing unit 70 reproduces the third information (binary information) recorded in the third track Tr3 while opposing the third track Tr3. The reproducing unit 70 reproduces the fourth information (binary information) recorded in the fourth track Tr4 while opposing the fourth track Tr4.

A width wb1 in the second direction of the third track Tr3 is substantially the same as the recording width Ww. A width wb2 in the second direction of the fourth track Tr4 is substantially the same as the recording width Ww.

In the embodiment, for example, recording by shingled magnetic recording (SMR) may be performed for the third track Tr3 and the fourth track Tr4. For example, recording is performed in a region r40 (the region where the information corresponding to the fourth track Tr4 is recorded). Subsequently, recording is performed in a region r30 (the region where the information corresponding to the third track Tr3 is recorded). The region r30 overlaps a portion of the region r40. In such a case, the width wb2 in the second direction of the fourth track Tr4 is wider than the width wb1 in the second direction of the third track Tr3. The width wb2 in the second direction of the fourth track Tr4 is substantially the same as the recording width Ww.

For example, the recording of the first track Tr1 and the second track Tr2 illustrated in FIG. 24A may be performed in the middle region pc; and the recording of the third track Tr3 and the fourth track Tr4 illustrated in FIG. 24B may be performed in at least one of the inner region pa or the outer region pb.

In the magnetic recording and reproducing devices 150C to 150F, for example, the first track Tr1 and the second track Tr2 are provided inside the middle region pc. The third track Tr3 and the fourth track Tr4 are provided in at least one of the inner region pa or the outer region pb.

Third Embodiment

The embodiment relates to a magnetic recording and reproducing method.

Figure 25:
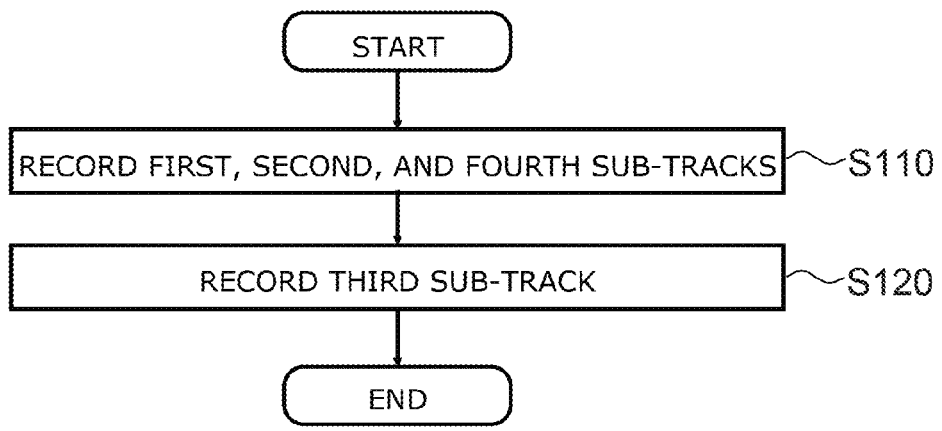
FIG. 25 is a flowchart illustrating the magnetic recording and reproducing method according to the third embodiment.

FIG. 25 is a flowchart illustrating the magnetic recording and reproducing method according to the third embodiment.

In the magnetic recording and reproducing method, for example, the information is recorded in the first track Tr1 and the second track Tr2 described in the first embodiment; and the recorded information is reproduced.

In other words, in the magnetic recording and reproducing method, the magnetic recording medium 80 includes the first track Tr1 that extends in the first direction, and the second track Tr2 that extends in the first direction and is arranged with the first track Tr1 in the second direction intersecting the first direction.

The first track Tr1 includes the first sub-track Ts1 that extends in the first direction, and the second sub-track Ts2 that extends in the first direction. The second track Tr2 includes the third sub-track Ts3 that extends in the first direction, and the fourth sub-track Ts4 that extends in the first direction. The second sub-track Ts2 is disposed between the first sub-track Ts1 and the fourth sub-track Ts4. The third sub-track Ts3 is disposed between the second sub-track Ts2 and the fourth sub-track Ts4.

The first sub-information corresponding to the first sub-track Ts1 is recorded in the first region r1 including the first sub-track Ts1 (referring to FIG. 6A). The second sub-information corresponding to the second sub-track Ts2 is recorded in the second region r2 that overlaps a portion of the first region r1 and includes the second sub-track Ts2 (referring to FIG. 6B). The fourth sub-information corresponding to the fourth sub-track Ts4 is recorded in the fourth region r4 including the fourth sub-track Ts4 (referring to FIG. 6C). The following is performed after the first operation of recording the information in the first region r1, the second region r2, and the fourth region r4.

The third sub-information corresponding to the third sub-track Ts3 is recorded in the third region r3 that overlaps a portion of the second region r2 and a portion of the fourth region r4 and includes the third sub-track Ts3 (referring to FIG. 6D).

According to the magnetic recording and reproducing method, the recording of information having a high recording density is possible. Also, random overwriting is possible.

In the magnetic recording and reproducing method, the following reproduction operation is performed. Namely, the first information that is recorded in the first track Tr1 is reproduced while opposing the first sub-track Ts1, the second sub-track Ts2, and the first boundary Bs1 between the first sub-track Ts1 and the second sub-track Ts2. The second information that is recorded in the second track Tr2 is reproduced while opposing the third sub-track Ts3, the fourth sub-track Ts4, and the second boundary Bs2 between the third sub-track Ts3 and the fourth sub-track Ts4.

In the magnetic recording and reproducing method, the width in the second direction of the third region r3 is substantially the same as the width in the second direction of each of the first region r1, the second region r2, and the fourth region r4. Considering the fluctuation of the boundary, etc., the width in the second direction of the third region r3 is not less than 0.9 times and not more than 1.1 times the width in the second direction of each of the first region r1, the second region r2, and the fourth region r4.

Figure 26:
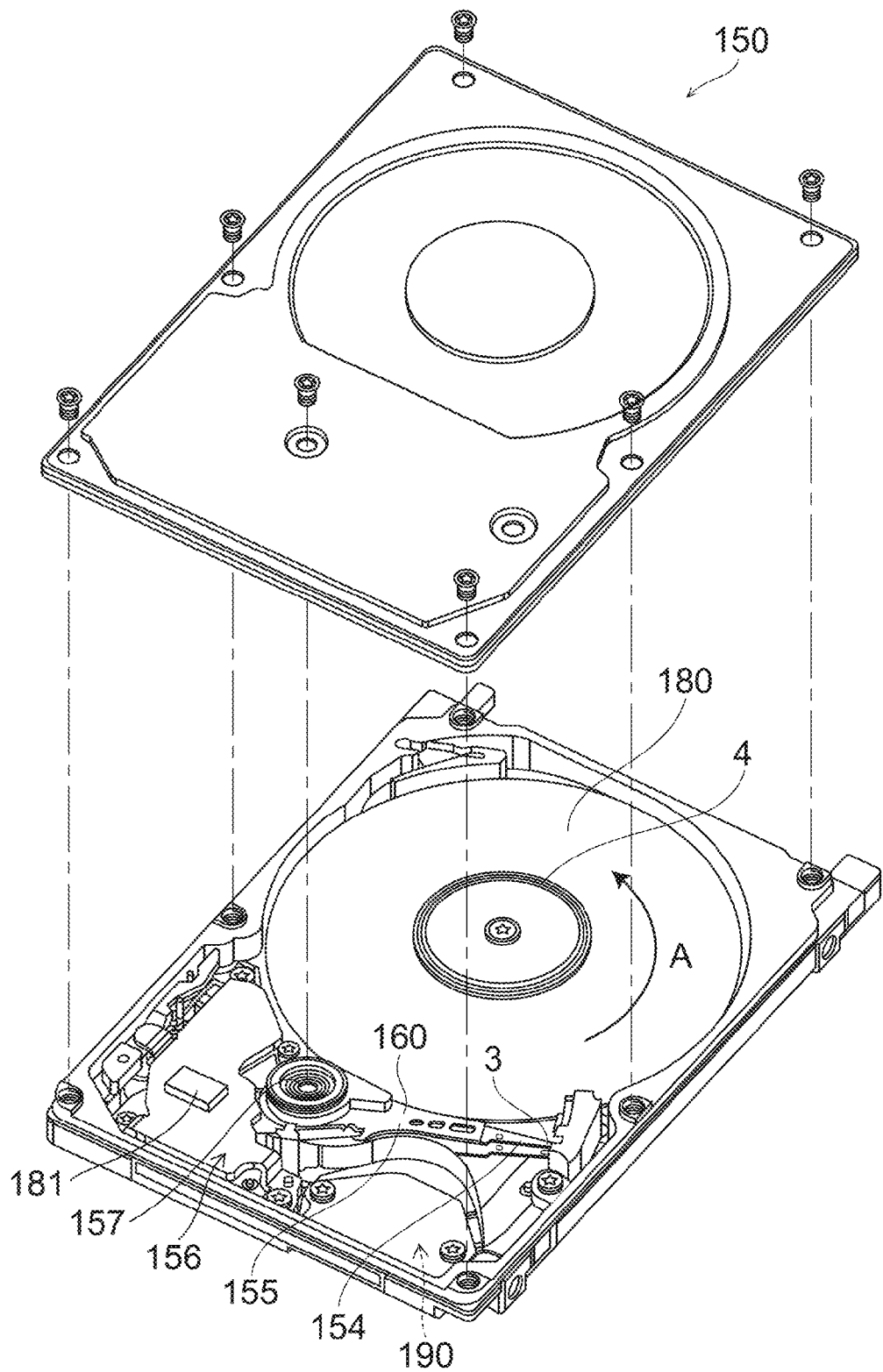
FIG. 26 is a schematic perspective view illustrating the magnetic recording and reproducing device according to the embodiment.

FIG. 26 is a schematic perspective view illustrating the magnetic recording and reproducing device according to the embodiment.

Figure 27A:
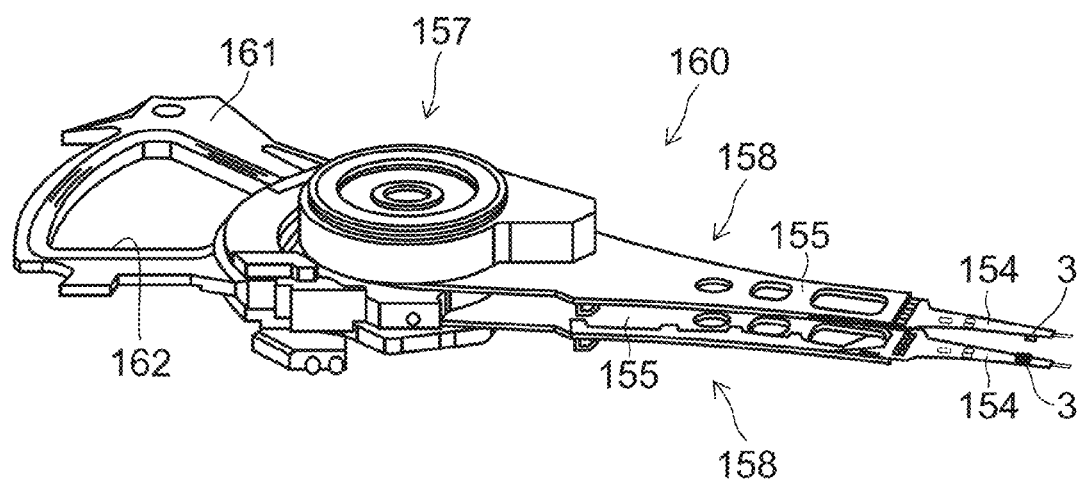
FIG. 27A and FIG. 27B are schematic perspective views illustrating a portion of the magnetic recording and reproducing device according to the embodiment.
Figure 27B:
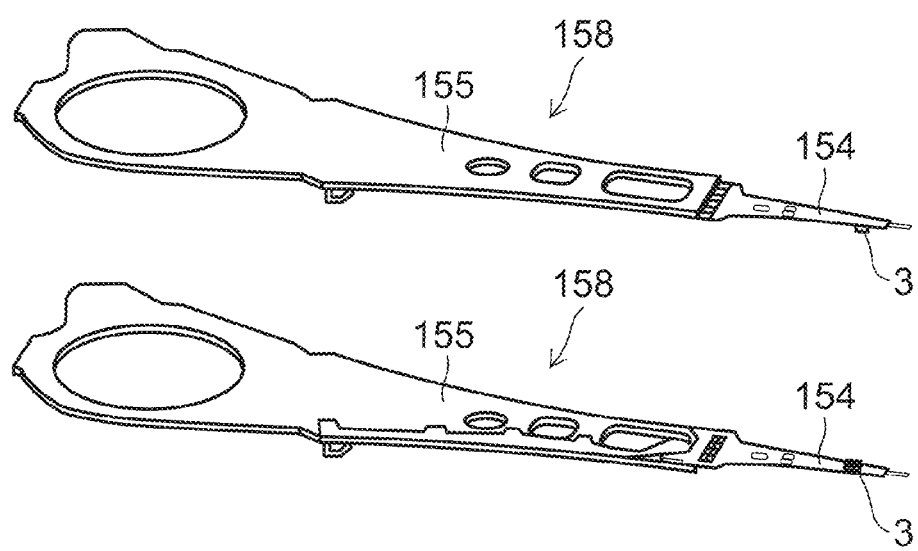

FIG. 27A and FIG. 27B are schematic perspective views illustrating a portion of the magnetic recording and reproducing device according to the embodiment.

As shown in FIG. 26, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

The head slider 3 that performs the recording and reproducing of the information stored in the recording medium disk 180 has a configuration such as that described above and is mounted to the tip of a suspension 154 having a thin-film configuration. Here, for example, one of the magnetic heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of the arm 155 (the actuator arm) that includes a bobbin unit holding a drive coil, etc. A voice coil motor 156 which is one type of linear motor is provided at one other end of the arm 155. The voice coil motor 156 may include a drive coil that is wound onto the bobbin unit of the arm 155, and a magnetic circuit made of a permanent magnet and an opposing yoke that are disposed to oppose each other with the coil interposed. The suspension 154 has one end and one other end; the magnetic head is mounted to the one end of the suspension 154; and the arm 155 is connected to the one other end of the suspension 154.

The arm 155 is held by ball bearings provided at two locations on and under a bearing unit 157; and the arm 155 can be caused to rotate and slide unrestrictedly by the voice coil motor 156. As a result, the magnetic head is movable to any position of the recording medium disk 180.

FIG. 27A illustrates the configuration of a portion of the magnetic recording and reproducing device and is an enlarged perspective view of a head stack assembly 160.

FIG. 27B is a perspective view illustrating a magnetic head assembly (a head gimbal assembly (HGA)) 158 which is a portion of the head stack assembly 160.

As shown in FIG. 27A, the head stack assembly 160 includes the bearing unit 157, the head gimbal assembly 158 that extends from the bearing unit 157, and a support frame 161 that extends from the bearing unit 157 in the opposite direction of the HGA and supports a coil 162 of the voice coil motor.

As shown in FIG. 27B, the head gimbal assembly 158 includes the arm 155 that extends from the bearing unit 157, and the suspension 154 that extends from the arm 155.

The head slider 3 is mounted to the tip of the suspension 154. One of the magnetic heads according to the embodiments is mounted to the head slider 3.

In other words, the magnetic head assembly (the head gimbal assembly) 158 according to the embodiment includes the magnetic head according to the embodiment, the head slider 3 to which the magnetic head is mounted, the suspension 154 that has the head slider 3 mounted to one end of the suspension 154, and the arm 155 that is connected to the other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the magnetic head embedded in the head slider 3.

A signal processor 190 is provided to write and reproduce the signals to and from the magnetic recording medium by using the magnetic head. For example, the signal processor 190 is provided on the backside of the drawing of the magnetic recording and reproducing device 150 illustrated in FIG. 26. The input/output lines of the signal processor 190 are electrically connected to the magnetic head by being connected to electrode pads of the head gimbal assembly 158.

Thus, the magnetic recording and reproducing device 150 according to the embodiment includes a magnetic recording medium, the magnetic head according to the embodiment recited above, a movable unit that is relatively movable in a state in which the magnetic recording medium and the magnetic head are separated from each other or in contact with each other, a position controller that aligns the magnetic head at a prescribed recording position of the magnetic recording medium, and a signal processor that writes and reproduces signals to and from the magnetic recording medium by using the magnetic head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes the magnetic recording medium, the magnetic head assembly according to the embodiment, and the signal processor that writes and reproduces signals to and from the magnetic recording medium by using the magnetic head mounted to the magnetic head assembly.

According to the embodiments, a magnetic recording and reproducing device is provided in which stable magnetic recording and reproducing are possible.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording and reproducing devices such as magnetic recording media, magnetic heads, recording units, reproducing units, and controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
    a magnetic recording medium including a first track and a second track, the first track extending in a first direction, the second track extending in the first direction and being arranged with the first track in a second direction intersecting the first direction;
a recording unit; and
a reproducing unit,
the first track including
  a first sub-track extending in the first direction, and
  a second sub-track extending in the first direction,
the second track including
  a third sub-track extending in the first direction, and
  a fourth sub-track extending in the first direction,
the second sub-track being disposed between the first sub-track and the fourth sub-track,
the third sub-track being disposed between the second sub-track and the fourth sub-track,
the recording unit recording information in the first track and the second track,
the reproducing unit reproducing first information recorded in the first track while opposing the first sub-track, the second sub-track, and a first boundary between the first sub-track and the second sub-track,
the reproducing unit reproducing second information recorded in the second track while opposing the third sub-track, the fourth sub-track, and a second boundary between the third sub-track and the fourth sub-track,
the first sub-track having a first sub-track width along the second direction,
the second sub-track having a second sub-track width along the second direction,
the third sub-track having a third sub-track width along the second direction,
the fourth sub-track having a fourth sub-track width along the second direction, and
the third sub-track width being wider than the first sub-track width, being wider than the second sub-track width, and being wider than the fourth sub-track width.

2. The device according to claim 1, wherein
the first sub-track includes a first recording component,
the second sub-track includes a second recording component arranged with the first recording component in the second direction,
a first recording symbol is formed of the first recording component and the second recording component,
the first recording symbol has a first value when a magnetization of the first recording component is in a first state and a magnetization of the second recording component is in the first state,
the first recording symbol has a second value when the magnetization of the first recording component is in a second state and the magnetization of the second recording component is in the second state,
the first recording symbol has a third value when the magnetization of the first recording component is in the first state and the magnetization of the second recording component is in the second state,
the third sub-track includes a third recording component,
the fourth sub-track includes a fourth recording component arranged with the third recording component in the second direction,
a second recording symbol is formed of the third recording component and the fourth recording component,
the second recording symbol has the first value when a magnetization of the third recording component is in the first state and a magnetization of the fourth recording component is in the first state,
the second recording symbol has the second value when the magnetization of the third recording component is in the second state and the magnetization of the fourth recording component is in the second state,
the second recording symbol has the third value when the magnetization of the third recording component is in the first state and the magnetization of the fourth recording component is in the second state.

3. The device according to claim 2, wherein
the first recording symbol has the third value when the magnetization of the first recording component is in the second state and the magnetization of the second recording component is in the first state, and
the second recording symbol has the third value when the magnetization of the third recording component is in the second state and the magnetization of the fourth recording component is in the first state.

4. The device according to claim 1, wherein a distance between the first sub-track and the fourth sub-track is not less than 0.8 times and not more than 1.2 times a sum of the second sub-track width and the third sub-track width.

5. The device according to claim 1, wherein a sum of the first sub-track width and the second sub-track width is not less than 0.9 times and not more than 1.1 times a reproducing width of the reproducing unit.

6. The device according to claim 1, wherein the third sub-track width is not less than 0.9 times and not more than 1.1 times a recording width of the recording unit.

7. The device according to claim 1, wherein
a reproducing width Wr of the reproducing unit and a recording width Ww of the recording unit satisfy $$(Wr/\{Wr+(Ww-Wr/2)/2\}) \cdot 1.08 > 1.$$

8. The device according to claim 1, wherein
the magnetic recording medium further includes:
  a third track extending in the first direction; and
  a fourth track extending in the first direction, the fourth track being arranged with the third track in the second direction,
the third track includes:
  a fifth sub-track extending in the first direction; and
  a sixth sub-track extending in the first direction,
the fourth track includes:
  a seventh sub-track extending in the first direction; and
  an eighth sub-track extending in the first direction,
the sixth sub-track is disposed between the fifth sub-track and the eighth sub-track,
the seventh sub-track is disposed between the sixth sub-track and the eighth sub-track,
the recording unit further records information in the third track and the fourth track,
the reproducing unit reproduces third information recorded in the third track while opposing the fifth sub-track, the sixth sub-track, and a third boundary between the fifth sub-track and the sixth sub-track,
the reproducing unit reproduces fourth information recorded in the fourth track while opposing the seventh sub-track, the eighth sub-track, and a fourth boundary between the seventh sub-track and the eighth sub-track, and
a seventh sub-track width along the second direction of the seventh sub-track is wider than a fifth sub-track width along the second direction of the fifth sub-track, wider than a sixth sub-track width along the second direction of the sixth sub-track, and wider than an eighth sub-track width along the second direction of the eighth sub-track.

9. The device according to claim 1, wherein
the magnetic recording medium further includes:

a third track extending in the first direction; and
a fourth track extending in the first direction, the fourth track being arranged with the third track in the second direction,
the third track includes:
a fifth sub-track extending in the first direction; and
a sixth sub-track extending in the first direction,
the fourth track includes:
a seventh sub-track extending in the first direction; and
an eighth sub-track extending in the first direction,
the sixth sub-track is disposed between the fifth sub-track and the eighth sub-track,
the seventh sub-track is disposed between the sixth sub-track and the eighth sub-track,
the recording unit further records information in the third track and the fourth track,
the reproducing unit reproduces third information recorded in the third track while opposing the fifth sub-track, the sixth sub-track, and a third boundary between the fifth sub-track and the sixth sub-track,
the reproducing unit reproduces fourth information recorded in the fourth track while opposing the seventh sub-track, the eighth sub-track, and a fourth boundary between the seventh sub-track and the eighth sub-track,
an eighth sub-track width along the second direction of the eighth sub-track is wider than a fifth sub-track width along the second direction of the fifth sub-track, wider than a sixth sub-track width along the second direction of the sixth sub-track, and wider than a seventh sub-track width along the second direction of the seventh sub-track.

10. The device according to claim 1, wherein
the magnetic recording medium further includes:
a third track extending in the first direction; and
a fourth track extending in the first direction, the fourth track being arranged with the third track in the second direction,
the third track includes:
a fifth sub-track extending in the first direction; and
a sixth sub-track extending in the first direction,
the fourth track includes:
a seventh sub-track extending in the first direction; and
an eighth sub-track extending in the first direction,
the sixth sub-track is disposed between the fifth sub-track and the eighth sub-track,
the seventh sub-track is disposed between the sixth sub-track and the eighth sub-track,
the recording unit further records information in the third track and the fourth track,
the reproducing unit reproduces third information recorded in the third track while opposing the fifth sub-track, the sixth sub-track, and a third boundary between the fifth sub-track and the sixth sub-track,
the reproducing unit reproduces fourth information recorded in the fourth track while opposing the seventh sub-track, the eighth sub-track, and a fourth boundary between the seventh sub-track and the eighth sub-track,
a sixth sub-track width along the second direction of the sixth sub-track is wider than a fifth sub-track width along the second direction of the fifth sub-track, and
an eighth sub-track width along the second direction of the eighth sub-track is wider than a seventh sub-track width along the second direction of the seventh sub-track.

11. The device according to claim 8, wherein
the first sub-track includes a first recording component,
the second sub-track includes a second recording component arranged with the first recording component in the second direction,
a first recording symbol is formed of the first recording component and the second recording component,
the first recording symbol has a first value when a magnetization of the first recording component is in a first state and a magnetization of the second recording component is in the first state,
the first recording symbol has a second value when the magnetization of the first recording component is in a second state and the magnetization of the second recording component is in the second state,
the first recording symbol has a third value when the magnetization of the first recording component is in the first state and the magnetization of the second recording component is in the second state,
the third sub-track includes a third recording component,
the fourth sub-track includes a fourth recording component arranged with the third recording component in the second direction,
a second recording symbol is formed of the third recording component and the fourth recording component,
the second recording symbol has the first value when a magnetization of the third recording component is in the first state and a magnetization of the fourth recording component is in the first state,
the second recording symbol has the second value when the magnetization of the third recording component is in the second state and the magnetization of the fourth recording component is in the second state,
the second recording symbol has the third value when the magnetization of the third recording component is in the first state and the magnetization of the fourth recording component is in the second state,
the fifth sub-track includes a fifth recording component,
the sixth sub-track includes a sixth recording component arranged with the fifth recording component in the second direction,
a third recording symbol is formed of the fifth recording component and the sixth recording component,
the third recording symbol has the first value when a magnetization of the fifth recording component is in the first state and a magnetization of the sixth recording component is in the first state,
the third recording symbol has the second value when the magnetization of the fifth recording component is in the second state and the magnetization of the sixth recording component is in the second state,
the third recording symbol has the third value when the magnetization of the fifth recording component is in the first state and the magnetization of the sixth recording component is in the second state,
the seventh sub-track includes a seventh recording component,
the eighth sub-track includes an eighth recording component arranged with the seventh recording component in the second direction,
a fourth recording symbol is formed of the seventh recording component and the eighth recording component,
the fourth recording symbol has the first value when a magnetization of the seventh recording component is in the first state and a magnetization of the eighth recording component is in the first state,
the fourth recording symbol has the second value when the magnetization of the seventh recording component is in the second state and the magnetization of the eighth recording component is in the second state, and the fourth recording symbol has the third value when the magnetization of the seventh recording component is in the first state and the magnetization of the eighth recording component is in the second state.

12. The device according to claim 11, wherein the third recording symbol has the third value when the magnetization of the fifth recording component is in the second state and the magnetization of the sixth recording component is in the first state, and the fourth recording symbol has the third value when the magnetization of the seventh recording component is in the second state and the magnetization of the eighth recording component is in the first state.

13. The device according to claim 1, wherein the magnetic recording medium further includes a third track and a fourth track, the third track extending in the first direction, the fourth track extending in the first direction and being arranged with the third track in the second direction, the recording unit records binary information in the third track and in the fourth track, and the reproducing unit reproduces third information recorded in the third track while opposing the third track, and reproduces fourth information recorded in the fourth track while opposing the fourth track.

14. The device according to claim 8, wherein the magnetic recording medium has a disk configuration having a center, the magnetic recording medium includes an inner region, an outer region, and a middle region, the inner region is provided between the outer region and the center, the middle region is provided between the outer region and the inner region, the first track and the second track are provided inside the middle region, and the third track and the fourth track are provided in at least one of the inner region or the outer region.

15. The device according to claim 1, wherein an absolute value of a skew angle is 4 degrees or less.

16. The device according to claim 1, wherein the recording unit includes a magnetic pole, the magnetic pole includes a first magnetic pole end portion and a second magnetic pole end portion, the second magnetic pole end portion being separated from the first magnetic pole end portion in a direction intersecting the first direction, and a difference between an absolute value of a first bevel angle and an absolute value of a second bevel angle is 4 degrees or less, the first bevel angle being between the first direction and a first side surface of the magnetic pole including the first magnetic pole end portion, the second bevel angle being between the first direction and a second side surface of the magnetic pole including the second magnetic pole end portion.

17. The device according to claim 1, further comprising an arm having one end portion, one other end portion, and a middle portion between the one end portion and the one other end portion, the recording unit and the reproducing unit being mounted to the one end portion, a direction from the one other end portion toward the middle portion intersecting a direction from the middle portion toward the one end portion.

18. A magnetic recording and reproducing method, comprising:

recording third sub-information in a third region of a magnetic recording medium after performing a first operation on the magnetic recording medium, the magnetic recording medium including a first track and a second track, the first track extending in a first direction, the second track extending in the first direction and being arranged with the first track in a second direction intersecting the first direction, the first track including a first sub-track extending in the first direction, and
a second sub-track extending in the first direction, the second track including a third sub-track extending in the first direction, and
a fourth sub-track extending in the first direction, the second sub-track being disposed between the first sub-track and the fourth sub-track, the third sub-track being disposed between the second sub-track and the fourth sub-track, the first operation including recording first sub-information corresponding to the first sub-track in a first region of the magnetic recording medium including the first sub-track, recording second sub-information corresponding to the second sub-track in a second region of the magnetic recording medium including the second sub-track, the second region and a portion of the first region overlapping, and recording fourth sub-information corresponding to the fourth sub-track in a fourth region of the magnetic recording medium including the fourth sub-track, the third sub-information corresponding to the third sub-track, the third region including the third sub-track, the third region overlapping a portion of the second region and a portion of the fourth region, wherein the method further includes:

reproducing first information recorded in the first track while opposing the first sub-track, the second sub-track, and a first boundary between the first sub-track and the second sub-track, and reproducing second information recorded in the second track while opposing the third sub-track, the fourth sub-track, and a second boundary between the third sub-track and the fourth sub-track.

19. A magnetic recording and reproducing method, comprising:

recording third sub-information in a third region of a magnetic recording medium after performing a first operation on the magnetic recording medium, the magnetic recording medium including a first track and a second track, the first track extending in a first direction, the second track extending in the first direction and being arranged with the first track in a second direction intersecting the first direction, the first track including a first sub-track extending in the first direction, and
a second sub-track extending in the first direction, the second track including a third sub-track extending in the first direction, and
a fourth sub-track extending in the first direction, the second sub-track being disposed between the first sub-track and the fourth sub-track, the third sub-track being disposed between the second sub-track and the fourth sub-track, the first operation including recording first sub-information corresponding to the first sub-track in a first region of the magnetic recording medium including the first sub-track, recording second sub-information corresponding to the second sub-track in a second region of the magnetic recording medium including the second sub-track, the second region and a portion of the first region overlapping, and recording fourth sub-information corresponding to the fourth sub-track in a fourth region of the magnetic recording medium including the fourth sub-track, the third sub-information corresponding to the third sub-track, the third region including the third sub-track, the third region overlapping a portion of the second region and a portion of the fourth region, wherein a width in the second direction of the third region is not less than 0.9 times and not more than 1.1 times a width in the second direction of the first region, the width in the second direction of the third region is not less than 0.9 times and not more than 1.1 times a width in the second direction of the second region, and the width in the second direction of the third region is not less than 0.9 times and not more than 1.1 times a width in the second direction of the fourth region.

\* \* \* \* \*